United States Patent [19]

Oguro

[11] Patent Number: 5,907,656
[45] Date of Patent: *May 25, 1999

[54] APPARATUS AND METHOD FOR REPRODUCING VIDEO SIGNALS WITH VARYING-MAGNITUDE AGC SIGNALS

[75] Inventor: Masaki Oguro, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/783,022

[22] Filed: Jan. 14, 1997

Related U.S. Application Data

[63] Continuation of application No. 08/410,896, Mar. 27, 1995, abandoned.

[30] Foreign Application Priority Data

Mar. 29, 1994 [JP] Japan ................... 6-082576

[51] Int. Cl.⁶ .................. G11B 15/04; H04N 7/167; H04N 5/91
[52] U.S. Cl. ................... 386/94; 360/60; 380/5
[58] Field of Search ............ 360/60, 37.1; 358/335; 380/3, 5, 22, 15; 386/94

[56] References Cited

U.S. PATENT DOCUMENTS

| | | | |
|---|---|---|---|
| 4,631,603 | 12/1986 | Ryan | 360/60 |
| 5,194,965 | 3/1993 | Quan et al. | 360/60 |
| 5,315,448 | 5/1994 | Ryan | 360/60 |
| 5,394,470 | 2/1995 | Buynak | 380/5 |
| 5,418,853 | 5/1995 | Kanota et al. | 360/60 |
| 5,535,275 | 7/1996 | Sugisaki et al. | 380/10 |
| 5,557,336 | 9/1996 | Nakajima | 348/556 |
| 5,574,787 | 11/1996 | Ryan | 360/60 |
| 5,579,120 | 11/1996 | Oguro | 360/60 |
| 5,579,391 | 11/1996 | Ihara | 360/60 |

FOREIGN PATENT DOCUMENTS

| | | |
|---|---|---|
| 0 498 617 | 8/1992 | European Pat. Off. . |
| 0 574 892 | 12/1993 | European Pat. Off. . |
| 0 580 367 | 1/1994 | European Pat. Off. . |
| 0 581 227 | 2/1994 | European Pat. Off. . |

*Primary Examiner*—Aristotelis M. Psitos
*Assistant Examiner*—Regina Y. Neal
*Attorney, Agent, or Firm*—Frommer Lawrence & Haug, LLP.; William S. Frommer

[57] ABSTRACT

A signal format and reproducing apparatus compatible with that format protect the copyright of recorded video and audio data against digital and analog dubbing. The reproducing apparatus senses copyright information included in the signal reproduced from a record medium to generate a copyright protection signal which is placed in a vertical blanking interval of the analog output of the reproducing apparatus. If a Serial Copy Management System (SCMS) signal is reproduced, it is supplied to a digital VCR (Video Cassette Recorder). The copyright protection signal disrupts the AGC (Automatic Grain Circuit) of a recording analog VCR and the SCMS signal prevents a digital VCR from digitally dubbing the reproduced video and audio data.

30 Claims, 27 Drawing Sheets

| WORD NAME | MSB ............................................. LSB |
|---|---|
| PC0 | HEADER |
| PC1 | |
| PC2 | DATA |
| PC3 | |
| PC4 | |

--- UPPER HEADER

--- LOWER HEADER

--- LOWEST HIERARCHY BY BIT ALLOCATION

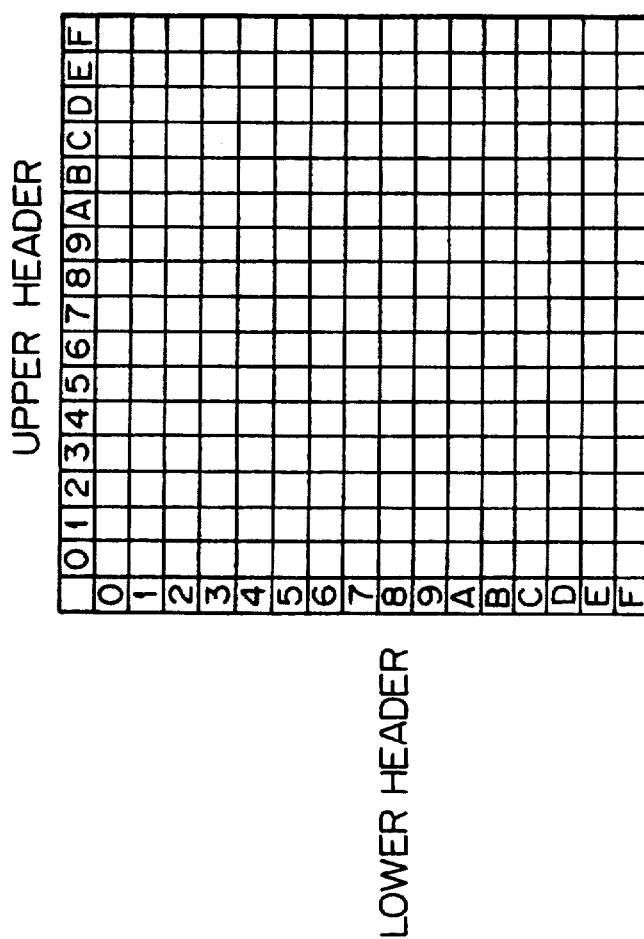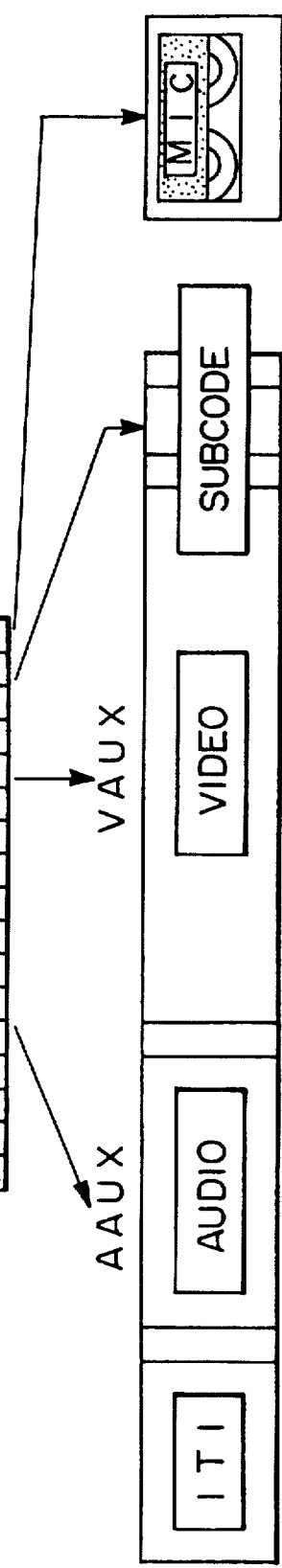
Fig. 8

PRE-SYNC BLOCK

POST-SYNC BLOCK

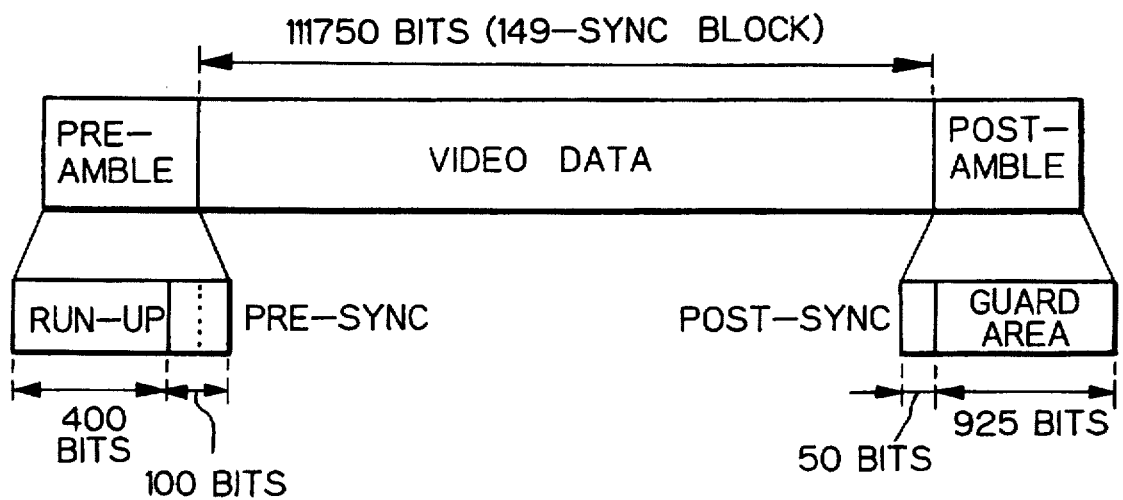

|  | ID0 | ID1 |
|---|---|---|
| MSB | APPLI2 | SYNC7 |
|  | APPLI1 | SYNC6 |
|  | APPLI0 | SYNC5 |
|  | SEQ0 | SYNC4 |
|  | TRACK3 | SYNC3 |
|  | TRACK2 | SYNC2 |
|  | TRACK1 | SYNC1 |
| LSB | TRACK0 | SYNC0 |

|  | ID0 | ID1 |
|---|---|---|
| MSB | SEQ3 | SYNC7 |
|  | SEQ2 | SYNC6 |
|  | SEQ1 | SYNC5 |
|  | SEQ0 | SYNC4 |
|  | TRACK3 | SYNC3 |
|  | TRACK2 | SYNC2 |
|  | TRACK1 | SYNC1 |
| LSB | TRACK0 | SYNC0 |

| | ID0 | ID1 |
|---|---|---|
| MSB | F/R | ABSTR3 |
| | AP33 | ABSTR2 |
| | AP32 | ABSTR1 |
| | AP31 | ABSTR0 |
| | ABSTR7 | SYNC3 |
| | ABSTR6 | SYNC2 |
| | ABSTR5 | SYNC1 |
| LSB | ABSTR4 | SYNC0 |

| | ID0 | ID1 |
|---|---|---|
| MSB | F/R | ABSTR3 |
| | INDEX | ABSTR2 |
| | SKIP | ABSTR1 |
| | PP | ABSTR0 |
| | ABSTR7 | SYNC3 |
| | ABSTR6 | SYNC2 |
| | ABSTR5 | SYNC1 |
| LSB | ABSTR4 | SYNC0 |

Fig. 22

| TRACK NUMBER → | 1 | 2 | 3 | 4 | 5 | 6 | 7 | 8 | 9 | 10 |
|---|---|---|---|---|---|---|---|---|---|---|
| | C | C | C | C | C | E | E | E | E | E |
| | B | B | B | B | B | D | D | D | D | D |
| 10 | A | A | A | A | A | A | A | A | A | A |
| | f | c | f | c | f | l | i | l | i | l |
| | e | b | e | b | e | k | h | k | h | k |
| | d | a | d | a | d | j | g | j | g | j |
| | C | C | C | C | C | E | E | E | E | E |
| 5 | B | B | B | B | B | D | D | D | D | D |
| | A | A | A | A | A | A | A | A | A | A |
| | c | f | c | f | c | i | l | i | l | i |
| | b | e | b | e | b | h | k | h | k | h |
| 0 | a | d | a | d | a | g | j | g | j | g |

↑ PACK NUMBER

Fig. 26

| Fig. 26A | Fig. 26B |
|---|---|

Fig. 26A

DIGITAL VCR 1 (REPRODUCING SIDE)

- 2 — (tape reels)
- 3 — REPRODUCED SIGNAL PROCESS
- 4 — AUDIO SIGNAL PROCESS
- 5 — VIDEO SIGNAL PROCESS
- 6 — SYSTEM DATA PROCESS
- 7 — D/A
- 8 — D/A
- 9 — SYNCHRONOUS SIGNAL GENERATOR
- 10 — CP SIGNAL GENERATOR
- 11 — VBID GENERATOR
- 12 — MIXING
- 13 — DIGITAL I/F

ANALOG AUDIO OUTPUT
ANALOG VIDEO OUTPUT

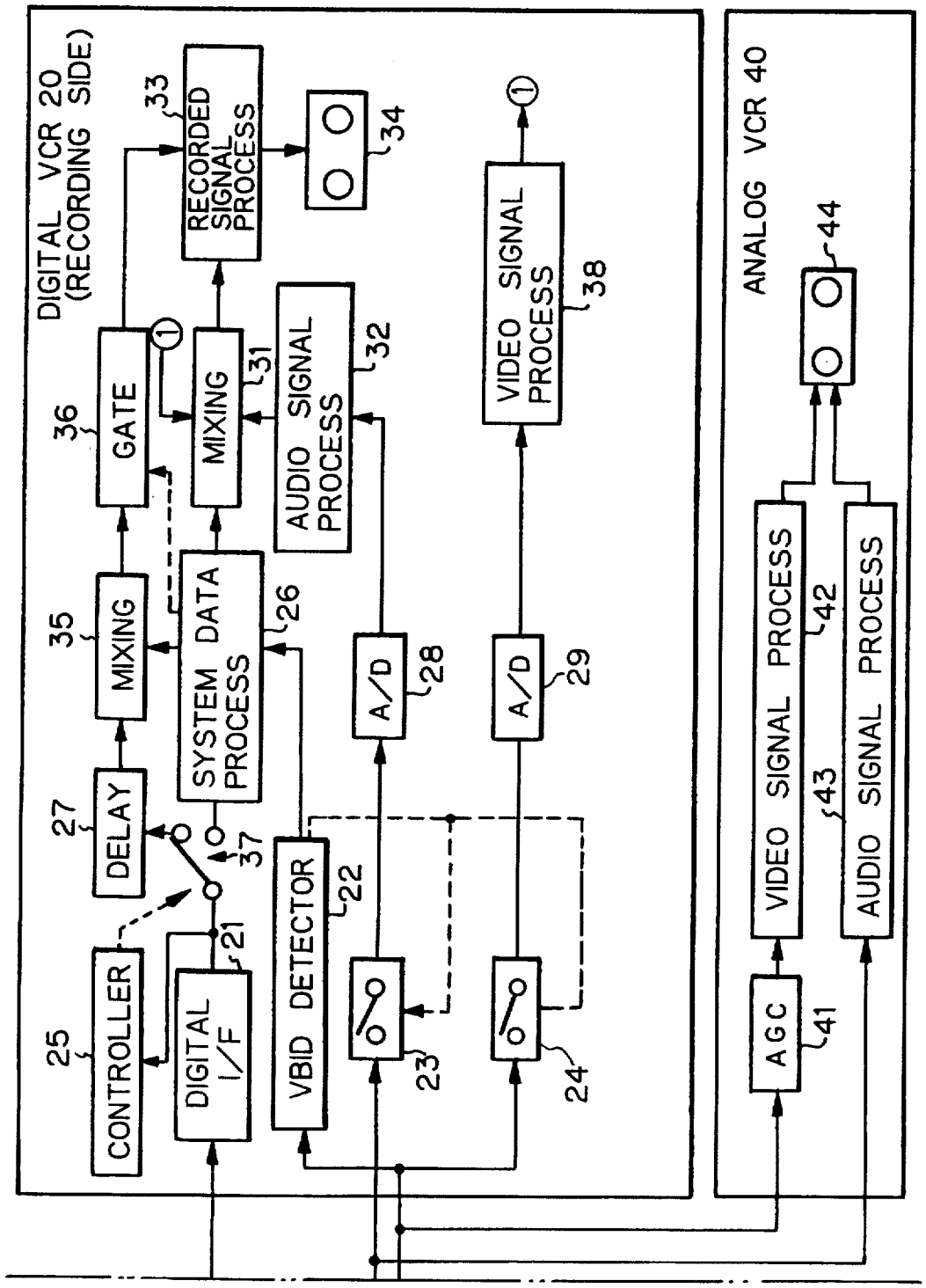

Fig. 28

| VAUX SCMS | AAUX SCMS | METHOD 1 VIDEO SIGNAL | METHOD 1 AUDIO SIGNAL | METHOD 2 VIDEO SIGNAL | METHOD 2 AUDIO SIGNAL |
|---|---|---|---|---|---|
| 0 0 | 0 0 | NOT CHANGED | NOT CHANGED | NOT CHANGED | NOT CHANGED |
| 0 0 | 1 0 | NOT CHANGED | REPLACED WITH 11 | NOT CHANGED | REPLACED WITH 11 |
| 0 0 | 1 1 | NOT CHANGED | DUBBING PROHIBITED | DUBBING PROHIBITED | DUBBING PROHIBITED |
| 1 0 | 0 0 | REPLACED WITH 11 | NOT CHANGED | REPLACED WITH 11 | NOT CHANGED |
| 1 0 | 1 0 | REPLACED WITH 11 | REPLACED WITH 11 | REPLACED WITH 11 | REPLACED WITH 11 |
| 1 0 | 1 1 | REPLACED WITH 11 | DUBBING PROHIBITED | DUBBING PROHIBITED | DUBBING PROHIBITED |
| 1 1 | 0 0 | DUBBING PROHIBITED | NOT CHANGED | DUBBING PROHIBITED | DUBBING PROHIBITED |
| 1 1 | 1 0 | DUBBING PROHIBITED | REPLACED WITH 11 | DUBBING PROHIBITED | DUBBING PROHIBITED |
| 1 1 | 1 1 | DUBBING PROHIBITED | DUBBING PROHIBITED | DUBBING PROHIBITED | DUBBING PROHIBITED |

| VAUX SCMS | AAUX SCMS | METHOD 3 VIDEO SIGNAL | METHOD 3 AUDIO SIGNAL | METHOD 4 VIDEO SIGNAL | METHOD 4 AUDIO SIGNAL |
|---|---|---|---|---|---|
| 0 0 | 0 0 | NOT CHANGED | NOT CHANGED | NOT CHANGED | NOT CHANGED |
| 0 0 | 1 0 | NOT CHANGED | NOT CHANGED | NOT CHANGED | REPLACED WITH 11 |
| 0 0 | 1 1 | NOT CHANGED | NOT CHANGED | NOT CHANGED | DUBBING PROHIBITED |
| 1 0 | 0 0 | REPLACED WITH 11 | NOT CHANGED | NOT CHANGED | NOT CHANGED |
| 1 0 | 1 0 | REPLACED WITH 11 | NOT CHANGED | NOT CHANGED | REPLACED WITH 11 |
| 1 0 | 1 1 | REPLACED WITH 11 | NOT CHANGED | NOT CHANGED | DUBBING PROHIBITED |
| 1 1 | 0 0 | DUBBING PROHIBITED | NOT CHANGED | NOT CHANGED | NOT CHANGED |
| 1 1 | 1 0 | DUBBING PROHIBITED | NOT CHANGED | NOT CHANGED | REPLACED WITH 11 |
| 1 1 | 1 1 | DUBBING PROHIBITED | NOT CHANGED | NOT CHANGED | DUBBING PROHIBITED |

Fig. 29

| | MSB | | | | | | | LSB |
|---|---|---|---|---|---|---|---|---|
| PC0 | 0 | 1 | 1 | 0 | 0 | 0 | 0 | 1 |
| PC1 | SCMS | | COPY SOURCE | | COPY GENERATION | | SS | |
| PC2 | RECORD START | 1 | RECORD MODE | | 1 | DISPLAY | | |
| PC3 | FF | FS | FC | IL | ST | SC | BCSYS | |
| PC4 | 1 | GENRE – CATEGORY | | | | | | |

Fig. 30

| | MSB | | | | | | | LSB |
|---|---|---|---|---|---|---|---|---|
| PC0 | 0 | 1 | 0 | 1 | 0 | 0 | 0 | 1 |
| PC1 | SCMS | | COPY SOURCE | | COPY GENERATION | | SS | |
| PC2 | RECORD START | RECORD END | RECORD MODE | | 1 | 1 | 1 | 1 |
| PC3 | DRF | SPEED | | | | | | |
| PC4 | 1 | GENRE – CATEGORY | | | | | | |

Fig. 31

| | MSB | | | | | | | LSB |
|---|---|---|---|---|---|---|---|---|
| PC0 | 0 | 1 | 1 | 0 | 0 | 0 | 0 | 1 |
| PC1 | SCMS | | COPY SOURCE | | COPY GENERATION | | SS | |
| PC2 | RECORD START | 1 | RECORD MODE | | 1 | DISPLAY | | |
| PC3 | FF | FS | FC | IL | ST | SC | BCSYS | |
| PC4 | RI | GENRE – CATEGORY | | | | | | |

Fig. 32A

| | MSB | | | | | | | LSB |
|---|---|---|---|---|---|---|---|---|
| PC0 | 1 | 0 | 0 | 0 | 0 | 0 | 0 | 0 |
| PC1 | LINE (BINARY) | | | | | | | |
| PC2 | B/W | EN | CLF | | CM | 1 | 1 | 1 |
| PC3 | TDS (BINARY) | | | | | | | |
| PC4 | QU | | SAMP | | | | | |

Fig. 32B

| | MSB | | | | | | | LSB |
|---|---|---|---|---|---|---|---|---|
| PC0 | 1 | 0 | 0 | 0 | 0 | 0 | 0 | 1 |
| PC1 | | | | | | | | |
| PC2 | | | | | | | | |
| PC3 | | | | | | | | |
| PC4 | | | | | | | | |

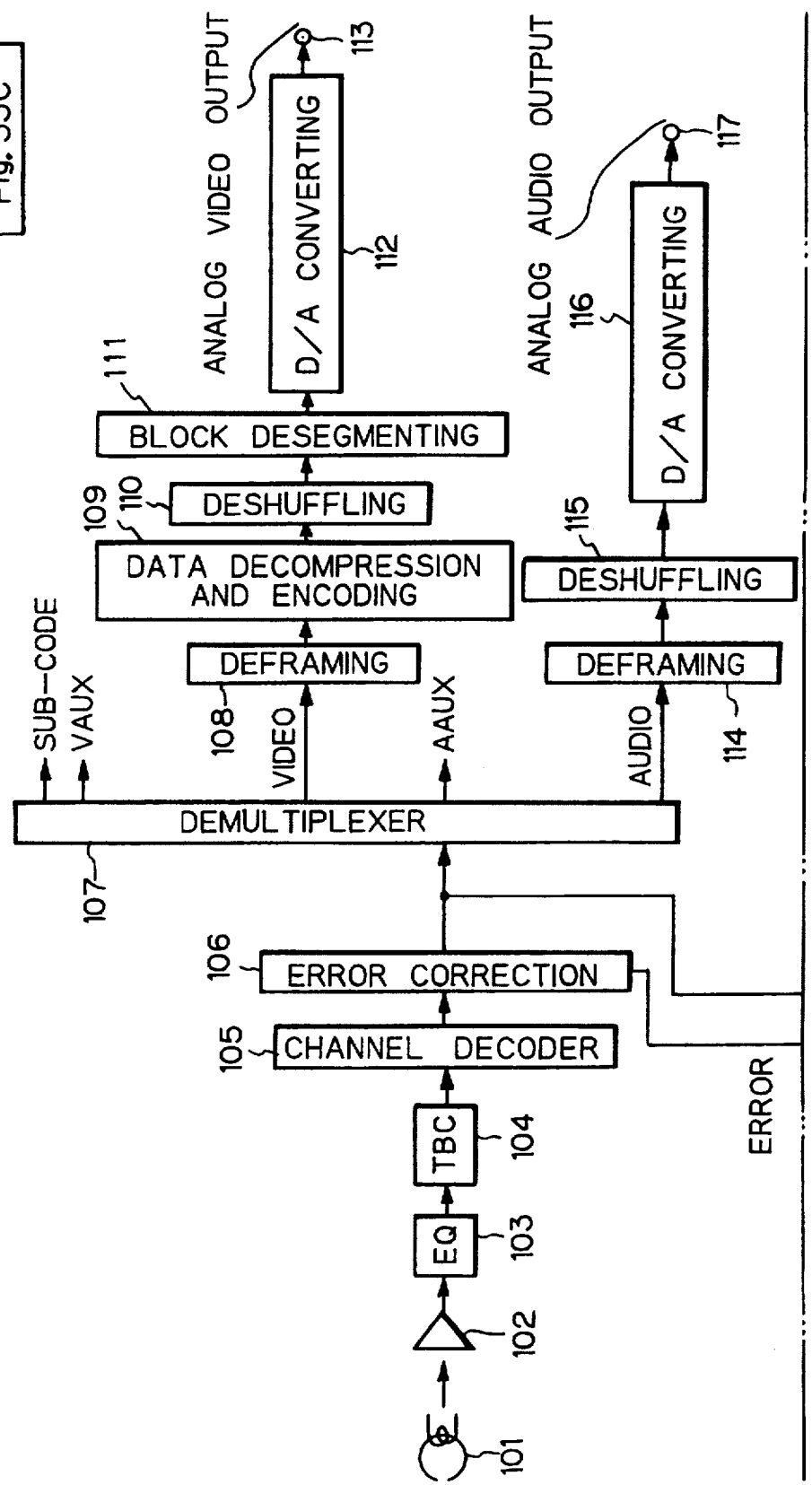

APPARATUS AND METHOD FOR REPRODUCING VIDEO SIGNALS WITH VARYING-MAGNITUDE AGC SIGNALS

This application is a continuation of application Ser. No. 08/410,896, filed Mar. 27, 1995 now abandoned.

BACKGROUND OF THE INVENTION

The present invention relates to a digital VCR for reproducing video data and audio data that are encoded and recorded on a magnetic tape.

U.S. Pat. No. 4,631,603 describes the recording of a signal (hereinafter referred to as a CP signal) in the vertical blanking interval of an analog TV signal. The copyright protection signal comprises a plurality of pairs of pulses, each pair in turn comprising a synchronizing pulse (such as a horizontal sync pulse) and a positive pulse. When an attempt is made to dub the contents of the tape, the CP signal disturbs the AGC of the recording VCR, thereby preventing the recording VCR from producing a faithful copy of the original tape. In this manner, the CP signal copyright protects the copyright to the contents of the original tape.

Unlike the analog VCR discussed above, there have been previously proposed digital VCRs that are not compatible with analog CP signals. These digital VCRs record compressed digital image data; signals that do not directly relate to the image (such as a vertical blanking interval or a horizontal interval) are not recorded onto the tape. Since the vertical blanking interval and the horizontal blanking interval are not recorded, the CP signal is also not recorded because the CP signal typically is included in the vertical blanking interval of the input video signal. The present invention is directed to a signal format and to a compatible reproducing apparatus that protect recorded video and audio data against dubbing by either a digital VCR or an analog VCR.

OBJECTS OF THE INVENTION

Therefore, it is an object of the present invention to provide a signal format for a recording medium adapted to protect the copyright to video and audio signals that are recorded on that recording medium.

Another object of this invention is to provide a signal format for selectively protecting the copyright to either video data or audio data that are recorded on a recording medium.

Still another object of the invention is to provide a signal format for limiting to a predetermined amount the number of copies that can be made of the contents of a recording medium.

A further object of this invention is to provide a digital reproducing apparatus that relies on a Serial Copy Management System (SCMS) signal to prevent a digital recording apparatus from dubbing video and audio signals that are played back by that digital reproducing apparatus.

An additional object of this invention is to provide a digital reproducing apparatus that relies on a copyright protection signal to prevent video and audio data from being dubbed by an analog recording apparatus using the analog output of the digital reproducing apparatus.

Various other objects, advantages and features of the present invention will become readily apparent from the ensuing detailed description, and the novel features will be particularly pointed out in the appended claims.

SUMMARY OF THE INVENTION

In accordance with this invention, a Serial Copy Management System (SCMS), which has been used in a previously proposed Digital Audio Tape (DAT) system, is adapted for use in a digital VCR. An SCMS signal recorded on the tape indicates whether the recorded data is protected by a copyright and how many legitimate copies of that data can be made. After the allotted number of copies have been made, the SCMS signal prevents a recording digital VCR from producing any more copies of the recorded data. The SCMS signal prevents dubbing of the recorded data only by another digital VCR.

In order to protect this recorded data from being dubbed by an analog VCR using the analog output of the digital VCR, a copyright protection signal under the control of the SCMS signal is inserted into the vertical blanking interval of the reproduced image signal. The reproduced image signal and the copyright protection signal are then supplied from the analog output of the digital VCR.

The reproducing apparatus of the present invention employs a recording medium on which are recorded an image signal, a sound signal, and a supplemental signal. The additional information included in the supplemental signal comprises at least copyright information. The reproducing apparatus reproduces a signal from the recording medium, detects the copyright information from the reproduced supplemental signal, and places a copyright protection signal in a vertical blanking interval of the reproduced image signal as a function of the detected copyright information.

Each track on the recording medium includes a VAUX video auxiliary data area and an AAUX audio auxiliary data area. Either one or both of these areas may include the copyright information. Thus, the copyright information selectively protects either the video data or the audio data, or both, from unauthorized dubbing.

Therefore, according to the present invention, the copyright of a digital VCR tape can be protected against either a digital dubbing operation or an analog dubbing operation. Moreover, the video data and the audio data can be independently protected. Furthermore, the protected status of the video and audio data, as well as the number of legitimate copies that can be made of this data can be displayed.

The above, and other, objects, features and advantage of the present invention will become readily apparent from the following detailed description thereof which is to be read in connection with the accompanying drawings.

BRIEF DESCRIPTION OF THE DRAWINGS

The following detailed description, given by way of example and not intended to limit the present invention solely thereto, will best be understood in conjunction with the accompanying drawings in which:

FIG. 8 is a schematic diagram showing a pack header table;

FIG. 12 shows the arrangement of pack headers in each track;

FIG. 13 shows the structure of a video sector of a track;

FIG. 22 shows the data portion of the sub-code sector of FIG. 19;

FIGS. 26A–26B and 27A–27B are block diagrams showing VCRs that perform dubbing operations using the copyright information recorded on the medium to be dubbed;

FIG. 28 is a schematic diagram showing an operation of a system data process circuit in response to SCMS data;

FIG. 29 is a schematic diagram showing a VAUX source control pack;

FIG. 30 is a schematic diagram showing an AAUX source control pack;

FIG. 31 is a schematic diagram showing a VAUX source control pack with an RI flag;

FIGS. 32A and 32B are schematic diagrams showing a line pack that records a copyright protection signal; and FIGS. 33A, 33B and 33C are block diagrams showing a digital VCR that performs a dubbing operation.

DETAILED DESCRIPTION OF THE PREFERRED EMBODIMENTS

Next, with reference to the accompanying drawings, a preferred embodiment of the present invention will be described.

In a digital VCR that compresses digital video data, composite digital color video data is divided into a luminance signal Y and color difference signals (R-Y) and (B-Y). These signals are compressed in accordance with either a DCT (Discrete Cosine Transform) compressing technique, a variable length encoding technique, or any other highly efficient encoding technique. The compressed signals are recorded on a magnetic tape through a rotating head. In the standard definition system, the number of tracks per frame is 10 (in the case of 525 lines/60 Hz) or 12 (in the case of 625 lines/50 Hz). In the high definition system, the number of tracks per frame is twice as many as that in the standard system. In other words, the number of tracks per frame is 20 (in the case of 1125 lines/60Hz) or 24 (1250 lines/50 Hz).

In the present invention, an application ID system is used in conjunction with a digital VCR that can easily manage data when performing recording or reproducing operations. When this system is used, a cassette whose tape has record tracks divided into a VAUX area, an AAUX area, a sub-code, and an MIC (Memory Integrated Circuit, or Memory In Cassette) can be easily accommodated. This system protects the copyright to recorded data, and it can also determine whether recorded data is an original or merely a copy from another recording medium.

Figures 1A, 1B:
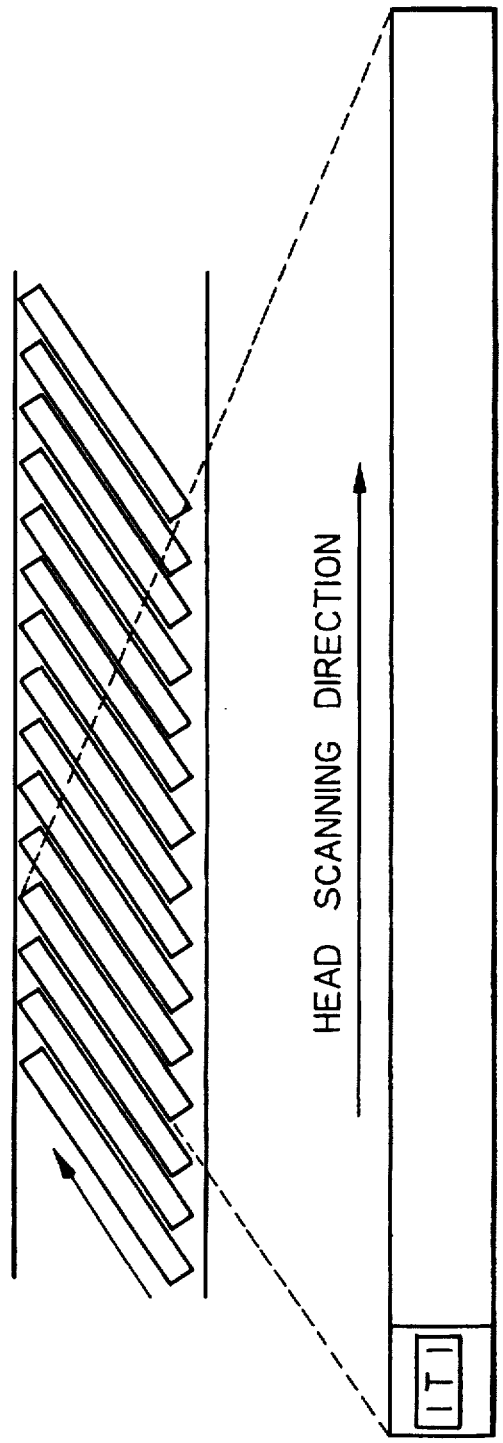
FIG. 1A shows an arrangement of oblique tracks on a tape for use with a digital VCR.
FIG. 1B shows the placement of an Insert and Track Information (ITI) area in each track of FIG. 1A.

On a tape for use with the digital VCR according to the present invention, as shown in FIG. 1A, oblique tracks are formed. In the case of the standard system, the number of tracks per frame is 10 or 12. In the case of the high definition system, the number of tracks per frame is 20 or 24.

FIG. 1B shows a track on the tape for use with the digital VCR. Each record track begins with a timing block, referred to as an ITI (Insert and Track Information) area, which is used to precisely align a subsequent area of data that is to be rewritten by a subsequent recording operation.

An ITI area includes a large number of sync blocks; each sync block having a short sync length and being assigned a sync number from the track entering side. The large number of sync blocks increases the probability that a magnetic head will precisely and stably align itself with a particular track. In this manner, when any sync block is detected, the position of the recording head on the current track can be precisely determined.

Figure 2:
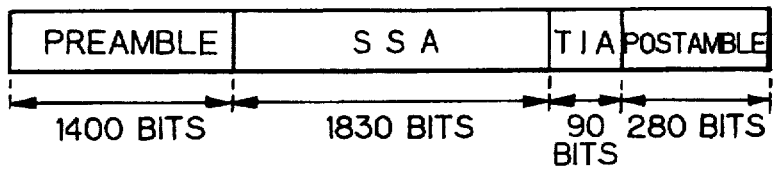
FIG. 2 shows the structure of an ITI area.

As shown in FIG. 2, the ITI area comprises a preamble, an SSA (Start Sync Block Area), a TIA (Track Information Area), and a postamble. The preamble has 1400 bits and functions as a run-in for a phase locked loop (PLL) for reproducing digital data. The SSA comprises 61 sync blocks, and as explained before, the sync blocks are used to precisely align the magnetic head with a corresponding track. Each of these sync blocks comprises 30 bits. The next portion after the SSA is the TIA, which comprises 3 blocks for a total of 90 bits. The TIA stores information relating to the entire track, such as APT data (Application ID of a Track) of three bits, an SP/LP bit, a reserve bit, and PF (Pilot Frame) data that represents the reference frame of a servo system of one bit. Following the TIA is the postamble, which comprises 280 bits.

The above mentioned apparatus is described in, for example, EP Publication Nos. 0572925 and 0595558. In the system described in these EP publications, a cassette is provided with a recording medium and an integrated circuit memory (MIC). When the cassette is inserted into the apparatus, the recording and reproducing operations of the apparatus are performed in accordance with the data read from the memory.

The MIC can store a Table Of Contents (TOC), index information, character information, reproduction control information, and timer record information. The MIC can also store information relating to the tape itself, such as tape length, thickness, and type. When an MIC cassette is inserted into a digital VCR, predetermined operations are carried out in accordance with the data stored in the MIC. These predetermined operations include, but are not limited to, skipping over a particular program, reproducing programs in a predetermined order, reproducing a still image (photo image) from a selected program, and setting a predetermined time for recording a particular program.

In address 0 of the MIC, the three bits of highest order store an APM (application ID of the MIC), as well as the APT (application ID of a Track), the latter also is stored in the TIA area of the track. An application ID defines the data structure of the area with which it is associated. For example, the APT application ID defines the data structure of the track with which it is associated, and the APM application ID defines the data structure of the MIC.

Figure 3:
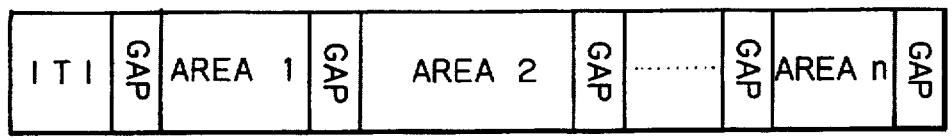
FIG. 3 shows the arrangement of data areas in each track.

With respect to the APT, its value defines the data structure of its corresponding track, as shown schematically in FIG. 3. The value of the APT defines the positions of AREA 1 to AREA n, the structure of the sync blocks in the ITI, and the structure of the track's ECC (error correction code) in each track. Moreover, each one of areas 1 to n within the track of FIG. 3 is associated with its own application ID (AP1 to APn); and each of these application IDs, in turn, defines the data structure of its corresponding area. That is, AP1 defines the data structure of AREA 1, AP2 defines the data structure of AREA 2, etc..

Figure 4:
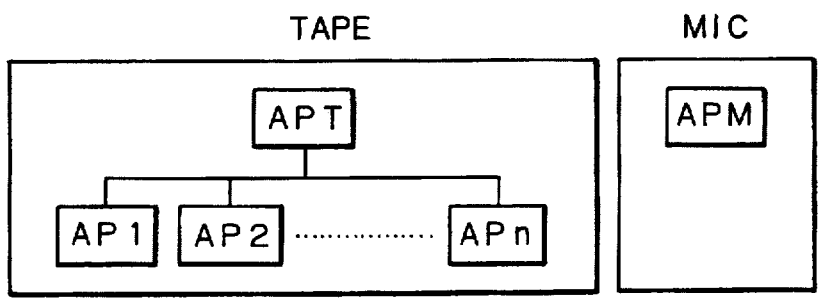
FIG. 4 shows a hierarchical structure of an application ID.

As shown in FIG. 4, the application IDs of each track are arranged as a predetermined hierarchy. The APT, which is the primary application ID, defines all the areas of the track, and it is at the top of the hierarchy. Immediately below the APT are the application IDs (AP1 to APn) of AREA 1 to AREA n of the track.

Figure 5A:
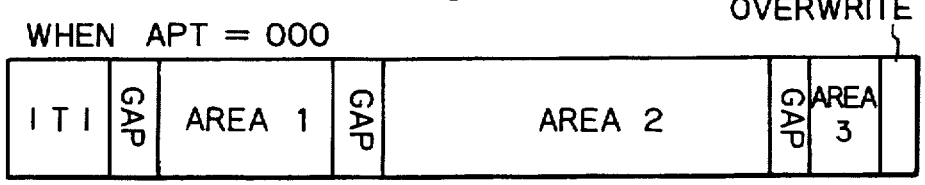
FIG. 5A shows a track structure that results when the application ID of the track is "000'"
Figure 5B:
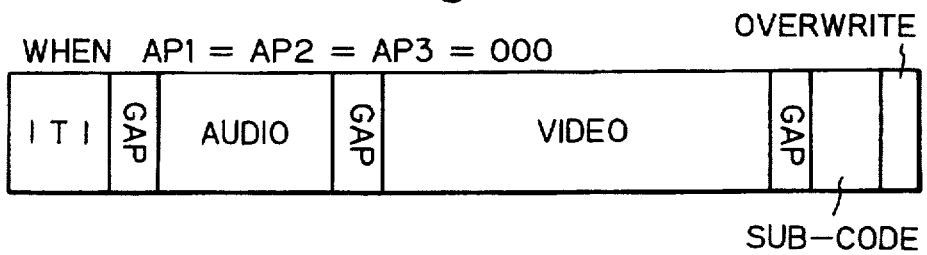
FIG. 5B shows a track structure that results when APT, APM, AP1, AP2, and AP3 are "000'"

FIG. 5A shows the track structure in the case when APT=000. This illustrated track shows AREAS 1, 2, and 3. The APT associated with this track defines the positions of these areas, the structure of the sync blocks in the ITI area, the structure of the ECC, the positions of gaps between each area, and an overwrite margin for protecting overwrite data. When the application ID AP1 of each AREA 1 is 000, its data structure corresponds to codes CVCR and AAUX. Code CVCR identifies a digital recording and reproducing apparatus for home use, and code AAUX corresponds to audio auxiliary data. When area AP2 is 000, its data structure corresponds to codes CVCR and VAUX, where VAUX corresponds to video auxiliary data When AP3 is 000, its data structure corresponds to sub-codes of CVCR and ID. FIG. 5B illustrates the data structure of a track when APT, APM, AP1, AP2 and AP3 all equal 000.

Figures 6, 7:
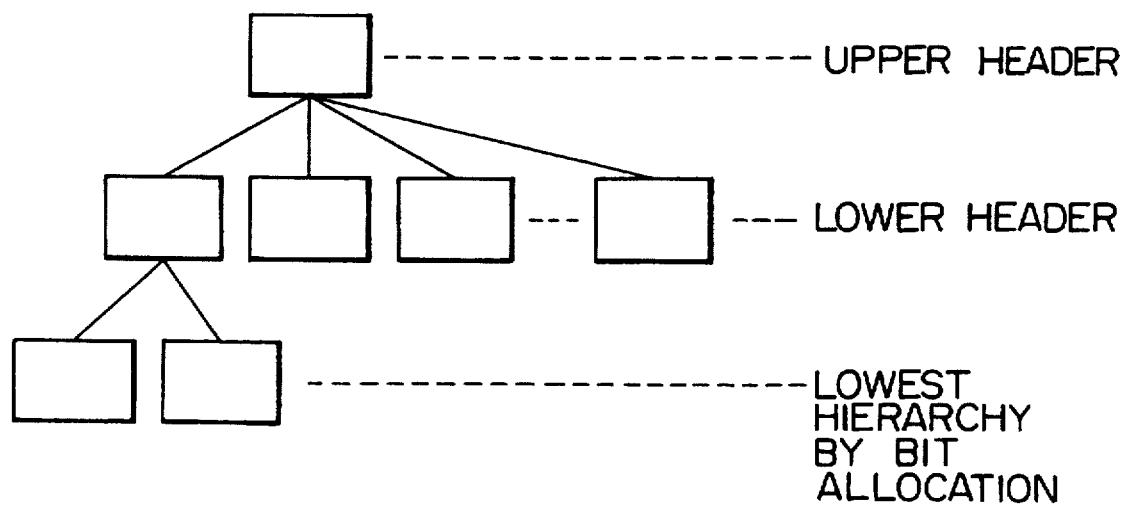
FIG. 6 is a schematic diagram showing the structure of a pack.
FIG. 7 is a schematic diagram showing a hierarchical structure of headers.

When APT=000, the AAUX, the VAUX, the sub-code, and the MIC are written in a common pack structure. As shown in FIG. 6, one pack has five bytes. The first byte PC0 comprises a header, and the remaining four bytes PC1-PC4 comprise data. The pack is the minimum unit of a data group, and all the data in each pack comprises related data. In FIG. 6, the header comprises eight bits; these eight bits being divided into four high order bits and four low order bits. As shown in FIG. 7, the four high order bits and the four low order bits are hierarchically structured as an upper header and a lower header, respectively. The remaining data of the pack can be assigned to even lower hierarchical levels. In this hierarchical structure, the contents of the pack can be clearly structured and easily expanded. As shown in FIG. 8, the upper header and the lower header constitute a pack header table that forms 256 space portions, and the pack header table is provided along with the data contents of each pack. Each one of AREAs 1 to n (see FIGS. 3 and 5, for example) is written with the pack header table. The byte length of the pack structure is normally fixed at five bytes. However, when character data is written to the MIC, a variable length pack structure is used in order to effectively use the limited buffer memory of the MIC.

Figure 9:
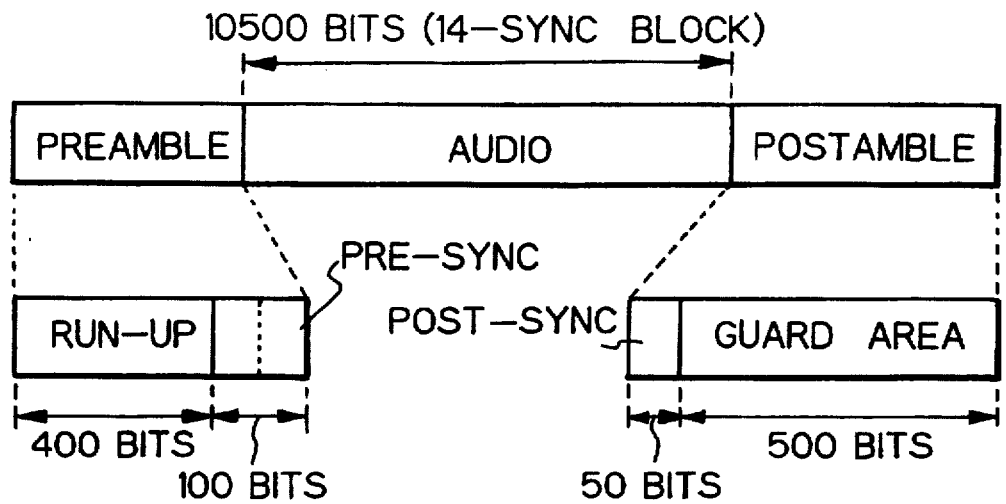
FIG. 9 shows the structure of an audio sector of a track.

An audio area and a video area of a track are referred to as an audio sector and a video sector, respectively. FIG. 9 shows the structure of an audio sector. The audio sector comprises a preamble, a data portion, and a postamble. The preamble includes 500 bits: the first 400 bits are referred to as a run-up portion and the remaining 100 bits are referred to as two pre-sync blocks. The run-up portion is used as a run-up pattern for a PLL (Phase-Locked Loop). The pre-sync blocks are used to detect a subsequent audio sync block. The data portion of the audio sector comprises 10500 bits. This data portion is divided into 14 audio sync blocks, the structure of which will be discussed in connection with FIG. 11. The postamble comprises 550 bits, which are divided into a post-sync block of 50 bits and a guard area of 500 bits. The post-sync block marks the end of the audio sector data portion. When an audio sector is rewritten, the guard area prevents the rewritten audio sector from overlapping into a subsequent video sector.

Figure 10A:
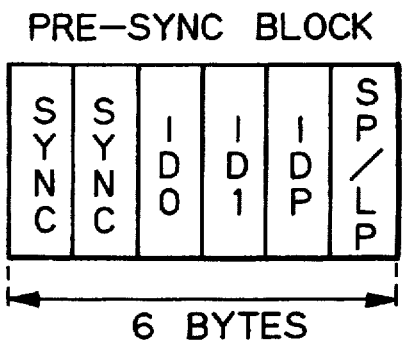
FIGS. 10A and 10B are schematic diagrams showing a structure of a pre-sync block and a post-sync block.
Figure 10B:
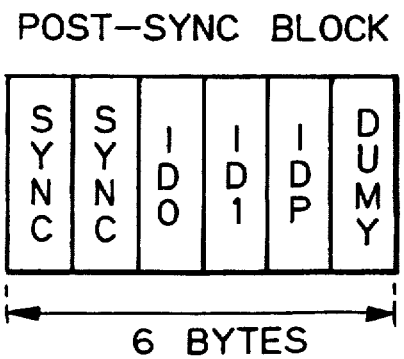

As shown in FIGS. 10A and 10B, each pre-sync block and the post-sync block each comprises six bytes. The value of the sixth byte of the pre-sync block determines whether the standard play mode or long play mode is enabled, thus determining the playback speed of the tape. The SP/LP identifying byte is also present in the TIA area as an SP/LP flag. When the value of the SP/LP flag is FFh, it represents the SP mode. When the value of the SP/LP flag is 00h, it represents the LP mode. When the SP/LP flag in the TIA area cannot be read, the SP/LP identifying byte of the pre-sync block is used. The sixth byte of the post-sync block comprises dummy data, FFh.

The pre-sync block and the post-sync block are recorded in accordance with the 24-25 conversion modulating system. In this modulating system, data comprising 24 bits is converted into data comprising 25 bits. Thus, the bit length of the pre-sync block and the post-sync block is as follows:

Pre-sync block–6×2×8×25÷24=100 bits

Post-sync block–6×1×8×25÷24=50 bits

Figure 11:
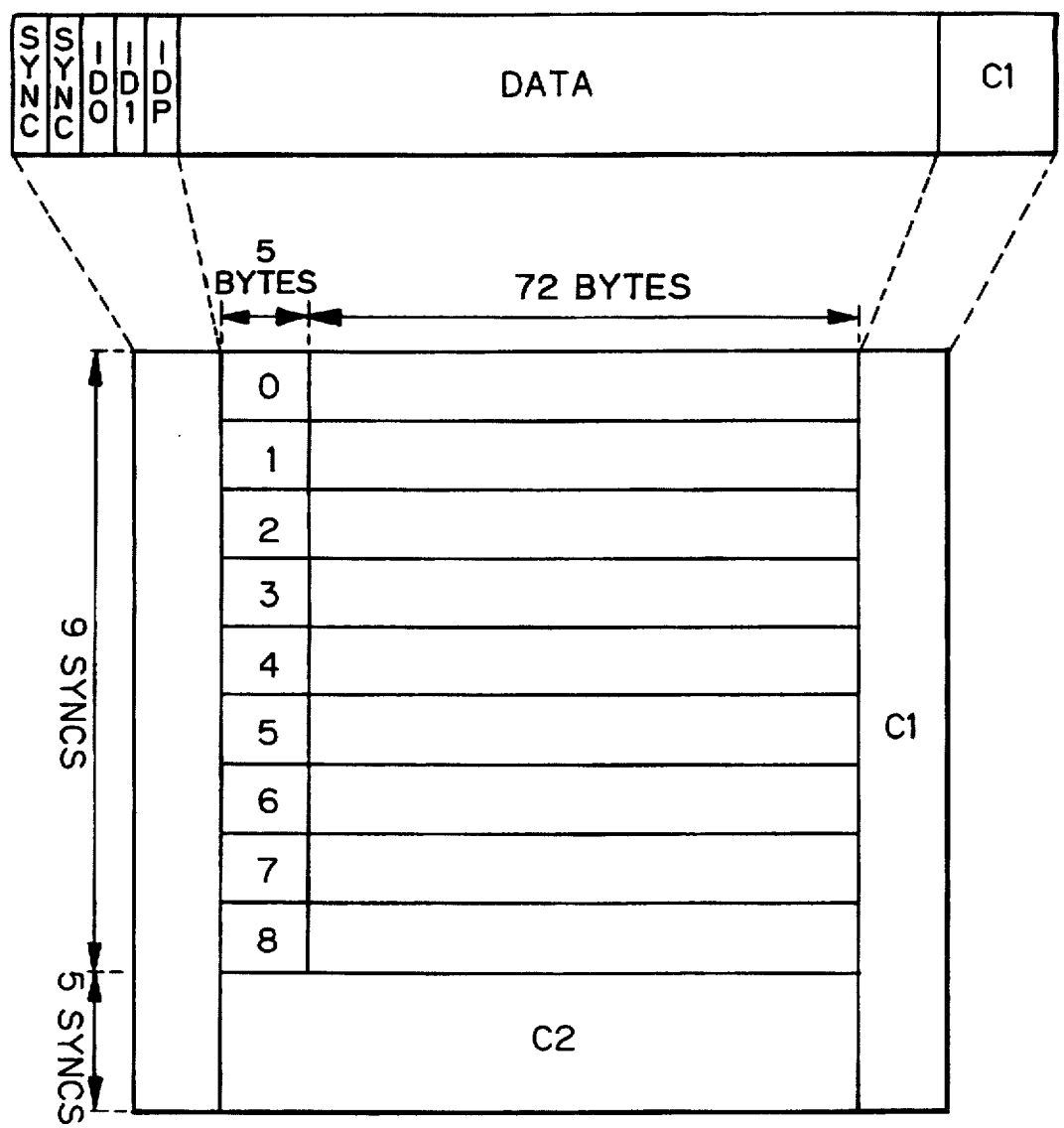
FIG. 11 shows the data portion of the audio sector of FIG. 9.

As shown in the horizontal direction of FIG. 11, an audio sync block comprises 90 bytes. The first five bytes of the audio sync block has the same data structure as the first five bytes of the pre-sync block and the post-sync block. Unlike the pre-sync block, the audio sync block does not include an SP/LP determining byte, and unlike the post-sync byte, the audio sync block does not include a dummy byte. The data portion of the audio sync block has 77 bytes that are protected by a horizontal parity code C1 comprising eight bytes and a vertical parity code C2 comprising five bytes blocks. Each track includes 14 of these audio sync blocks. These audio sync blocks are recorded in accordance with the 24-25 conversion modulating system. Thus, the total bit length of the audio sync blocks in each track is as follows:

90×14×8×25÷24=10500 bits.

The first five bytes of the data portion of each audio sync block comprise one pack used as auxiliary audio data (AAUX). In the vertical direction of FIG. 11, each track is arranged with nine packs. These nine packs are individually designated by numerals 0 to 8.

FIG. 12 is a schematic diagram showing nine packs that are arranged in the 525 lines/60 Hz system, in which one video frame comprises 10 tracks. In the case of the 625 lines/50 Hz system, one video frame comprises 12 tracks. Audio data and sub-code data are recorded and reproduced as video frames. In FIG. 12, numbers 50 to 55 represent values of pack headers in hexadecimal notation. As seen in FIG. 12, each of these pack headers is written once to each of the 10 tracks. The portion to which the pack headers are written is referred to as a main area. Each pack is written ten times in order to protect against error from horizontal scratches and channel clogging that may occur with the tape. The main area stores items that are essential for reproducing the audio data. Examples of such essential items are the sampling frequency and quantizing bit number.

As seen in FIG. 12, not all the areas are occupied by such essential items. These non-essential areas are referred to as optional areas; their contents are designated by letters a, b, c, d, e, f, g, h, etc.. In each track, the contents of each optional area are connected to each other along the direction of the arrows illustrated in FIG. 12. In the 525 lines/60 Hz system, one video frame includes 30 such optional areas, and in the 625 lines/50 Hz system, one video frame includes 36 such optional areas. Any pack from the pack header table shown in FIG. 8 can be selectively written into these optional areas.

The optional area may comprise a common option area, which typically includes character data, and a non-common option area, the contents of which are defined by each manufacturer. The optional area may also include only one of these areas. When the optional area has no information, a NO INFO pack is used. The manufacturer code pack distinguishes the application ID from these two areas. The manufacturer code pack is followed by the manufacturer optional area. The structures of the main area, the optional area, the common option, and the manufacturer option are used in the AAUX code, the VAUX code, the sub-code, and the MIC.

Figure 14:
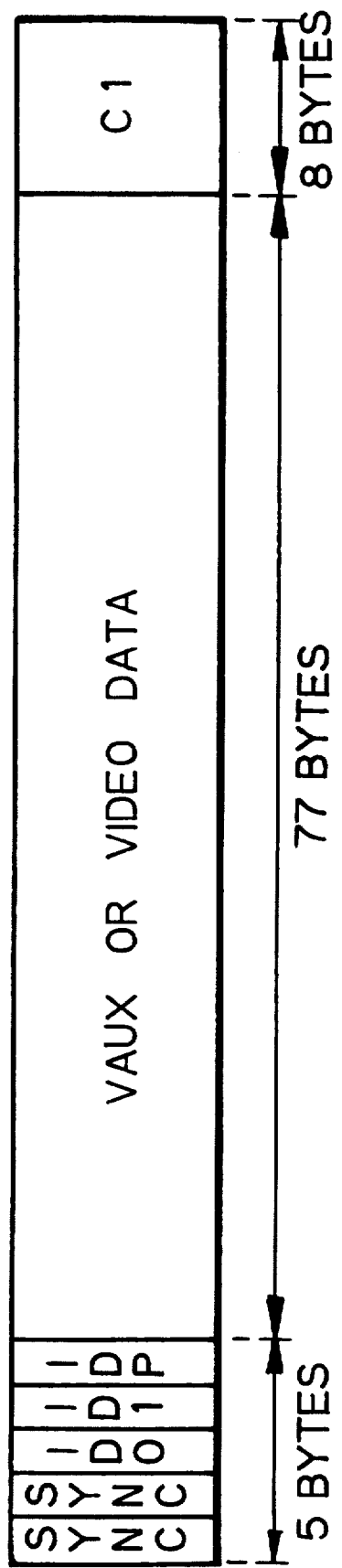
FIG. 14 shows the data portion of the video sector of FIG. 13.
Figure 15:
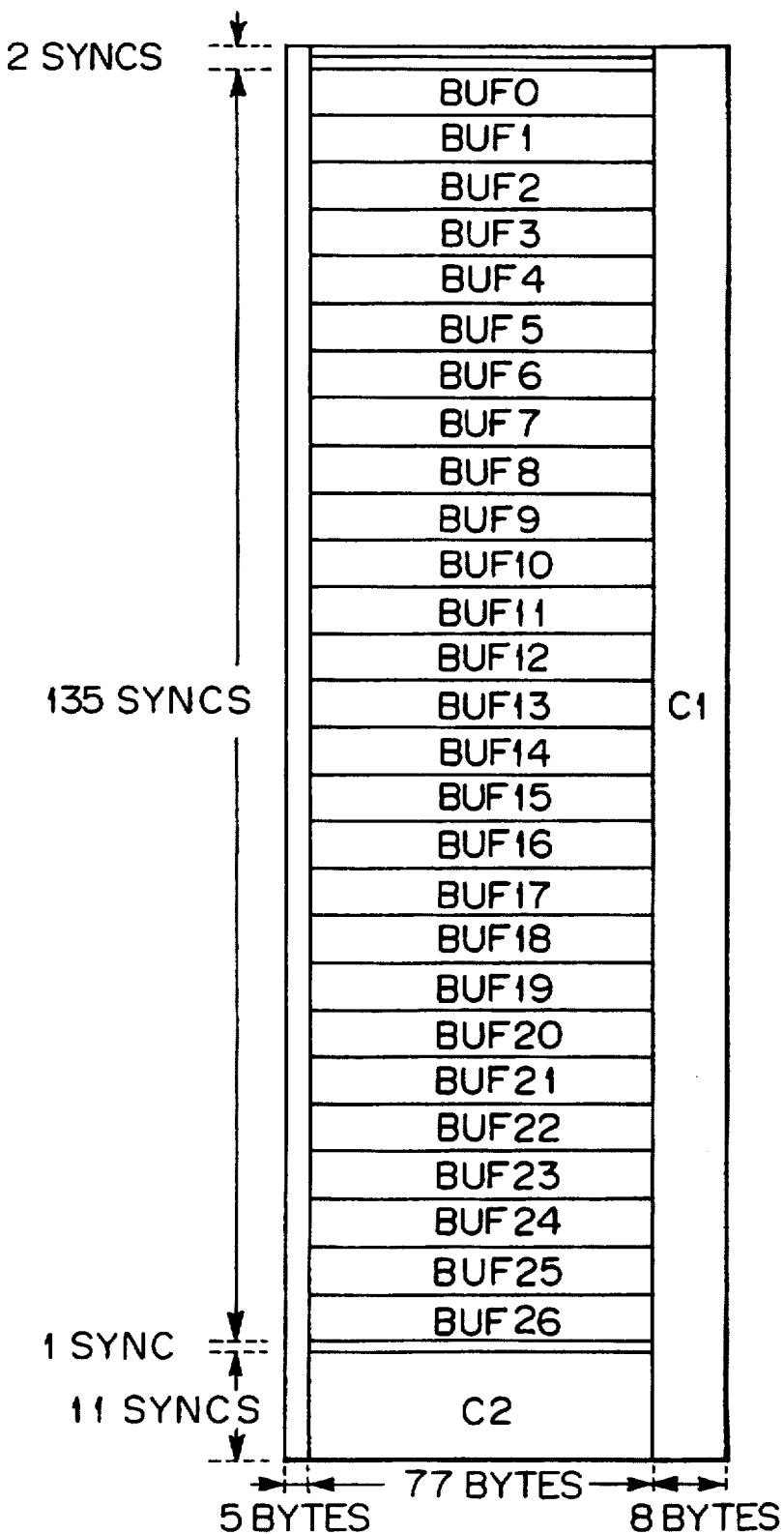
FIG. 15 is a more detailed illustration of the data portion of a video sector.

FIG. 13 illustrates the structure of a video sector. The preamble and the postamble of the video sector are the same as those of the audio sector shown in FIG. 9, except that the video sector guard area includes more bits than the audio sector guard area. As shown in FIG. 14, one video sync block comprises 90 bytes. The first five bytes of the video sync block have the same structure as the first five bytes of the audio sync block. The data portion of the video sync block has 77 bytes, which are protected by a horizontal parity code C1 that comprises eight bytes, and by a vertical parity code C2 that comprises 11 sync blocks, as shown in FIG. 15. FIG. 15 illustrates that each track includes 149 video sync blocks. The data bytes of the top two sync blocks and of the sync block immediately before the C2 parity code include VAUX data. The remaining sync blocks store video data compressed in accordance with a Discrete Cosine Transform (DCT) technique. The video sync blocks are then recorded in accordance with the 24-25 conversion modulation system. Thus, the total bit length of the video sync blocks per track is as follows:

90×149×8×25÷24=111750 bits

In FIG. 15, the middle 135 sync blocks constitute a video data area. In FIG. 15, BUF 0 to BUF 26 represent a plurality of buffering blocks. One buffering block comprises five sync blocks. Each track has 27 buffering blocks. Thus, 10 tracks, which constitute one video frame, include 270 buffering blocks. In other words, the system extracts and then samples a valid area from the image data of one frame. The digital data that results from this operation is shuffled into 270 groups that are collected from various portions of the real image. One of the 270 groups is a buffering unit. Each group is compressed in accordance with the DCT compressing technique so that the amount of data in all the groups corresponds to a predetermined compressing value. Thereafter, the data of each compressed buffering unit is packed in one buffering block that, in turn, comprises five sync blocks.

Figure 16:
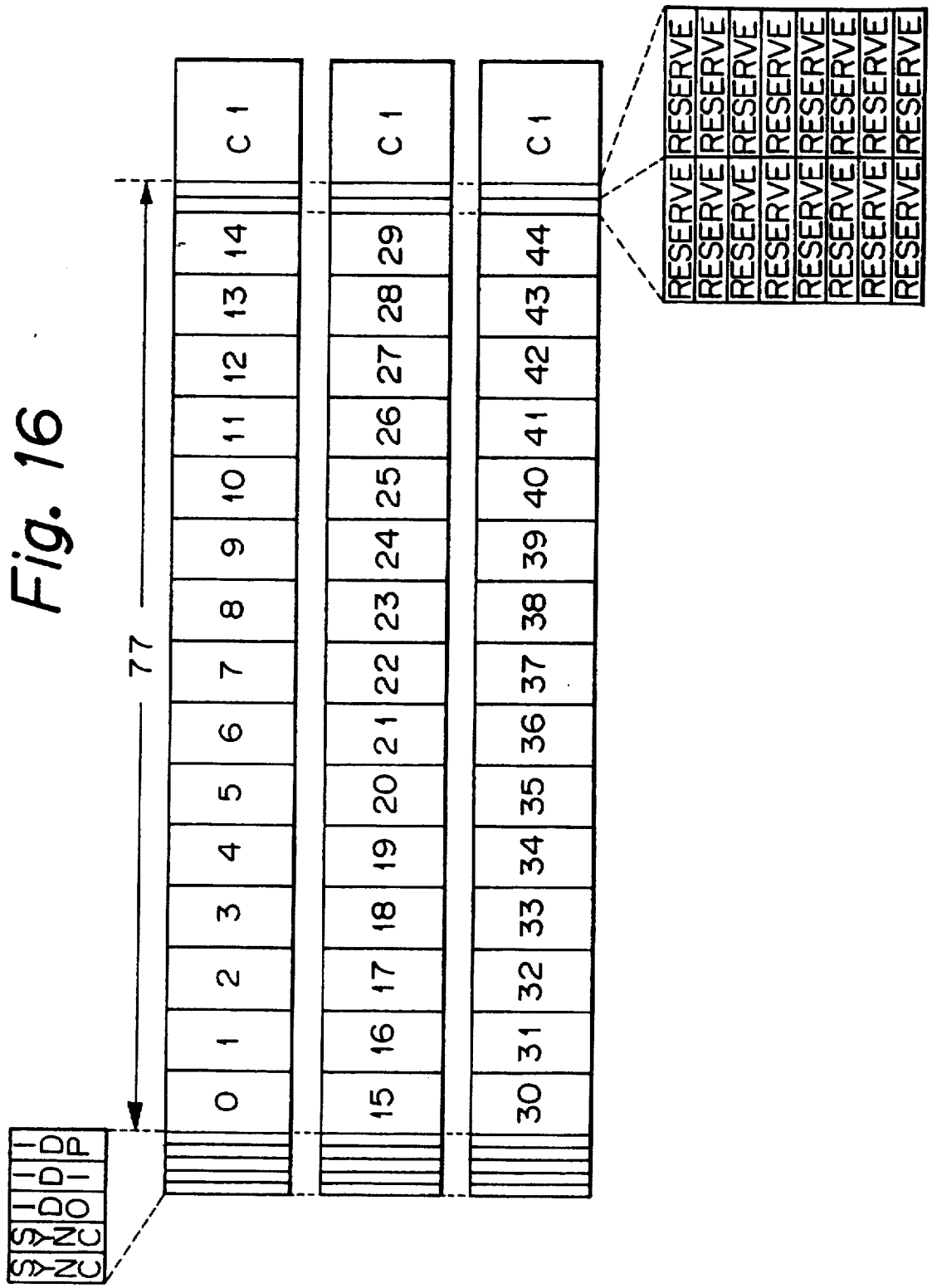
FIG. 16 shows the structure of the VAUX-dedicated sync block.

FIG. 16 illustrates the VAUX-dedicated sync blocks. The top two sync blocks of FIG. 16 correspond to the top two sync blocks of FIG. 15. The bottom sync block of FIG. 16 corresponds to the sync block located immediately before the C2 parity code of FIG. 15. The first 5 bytes of each sync block in FIG. 16 corresponds in structure to the first 5 bytes of the audio sync block. The next 75 bytes are grouped into 15 packs of 5 bytes each. Immediately before the C1 parity code, the remaining 2 bytes in each sync block of FIG. 16 are used as reserve bytes. As FIG. 16 illustrates, the 45 non-reserved bytes are numbered from 0 to 44.

Figure 17:
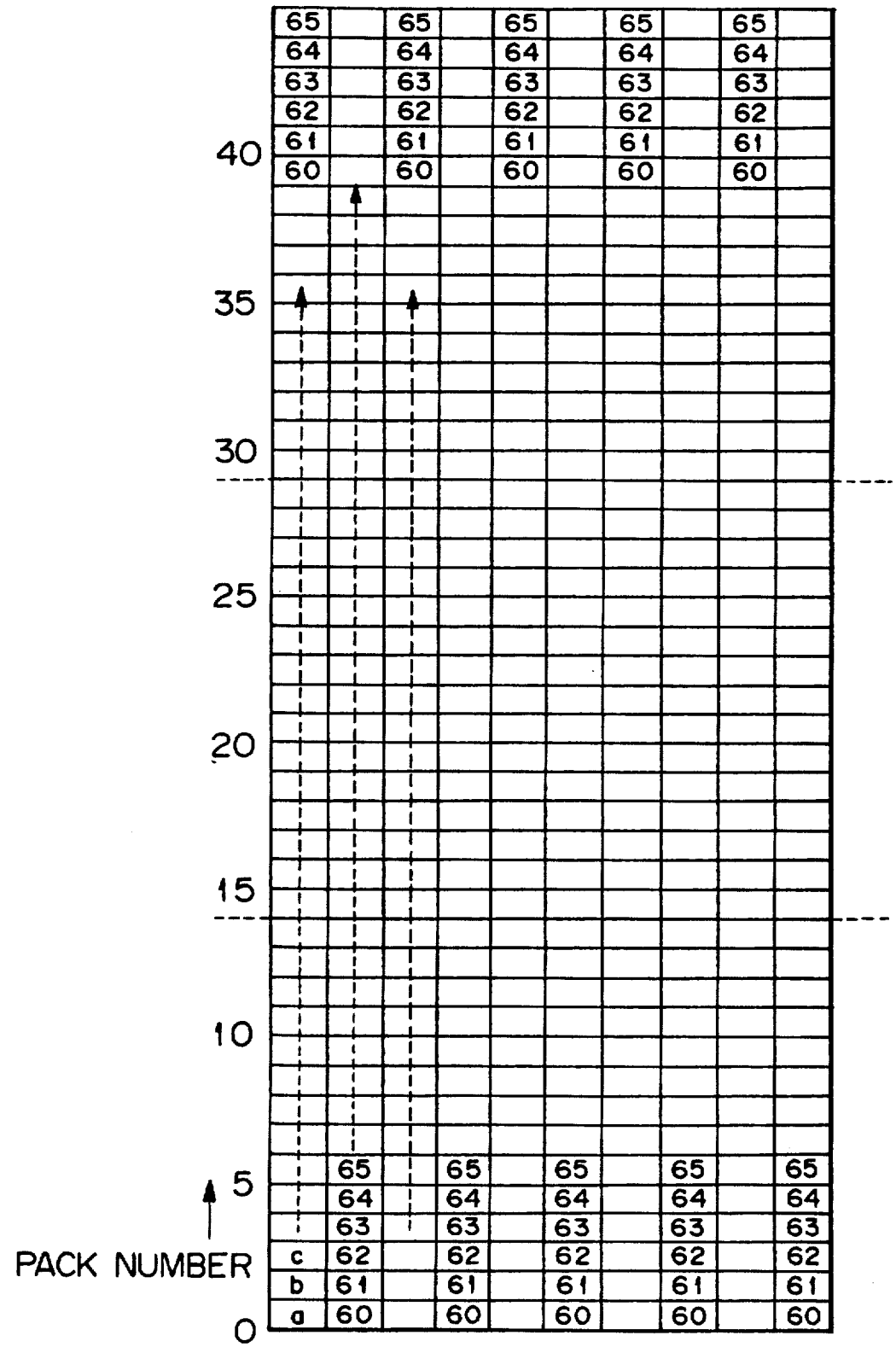
FIG. 17 is a more detailed illustration of the VAUX-dedicated sync blocks.

FIG. 17 illustrates in more detail the 45 packs of FIG. 16. In FIG. 17, numbers 60 to 65 represent, in hexadecimal notation, pack header values. Each pack is written ten times, once in each track in order to prevent errors from horizontal scratches and single-channel clogging that may occur with the tape. The area to which each pack header is written is referred to as a main area. The main area stores items that are essential for reproducing video data. Examples of such essential items are the television system type and the screen aspect ratio. As seen in FIG. 17, not all the areas are occupied by such essential items. These non-essential areas are referred to as optional areas; their contents are designated by letters a, b, c, etc.. In each track, the contents of each optional area are connected to each other along the direction of the arrow illustrated in FIG. 17. In the 525 line/60 Hz system, one video frame includes 390 such optional areas, and in the 625 line/50 Hz system, one video frame includes 468 such optional areas. The structure of the optional area in the video sector is the same as that in the audio sector.

Next, the ID portion will be described with respect to FIGS. 18A and 18B. Although not illustrated in these figures, an IDP (ID Parity) is used in the audio sector, the video sector, and the sub-code sector. In addition, the IDP is used as a parity for ID 0 and ID 1.

Figures 18A, 18B, 19:
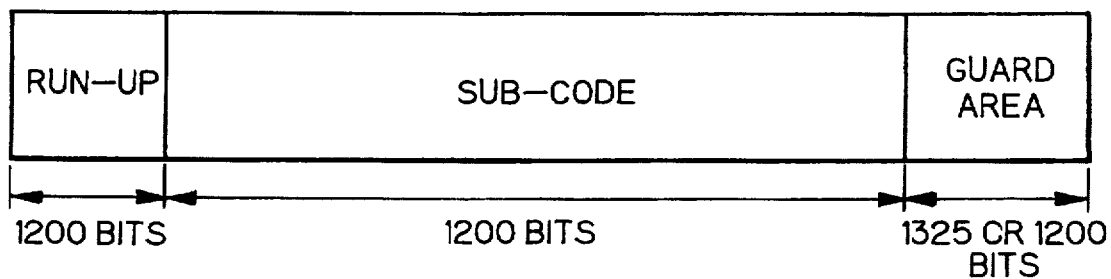
FIGS. 18A and 18B are schematic diagrams showing the format of an ID portion.
FIG. 19 shows the structure of a sub-code sector.

In FIG. 18A, ID 1 represents a location where a sync number is stored. In ID 1, numerals from 0 to 168 in binary notation are assigned from the pre-sync block of the audio sector to the post-sync block of the video data. The four low order bits of ID 0 store track numbers of one video frame. Track numbers are assigned every two tracks. The two tracks can be distinguished with respect to the azimuth angles of the magnetic heads. The value of the four high order bits of ID 0 depends on the position of the sync block. In FIG. 18B a sequence number of four bits is stored in the case of AAUX data, audio sync blocks, and video sync blocks. Twelve sequence numbers ranging from 0000 to 1011 are assigned for each video frame, thereby enabling the apparatus to distinguish data within the same frame during variable speed reproduction.

With respect to the pre-sync blocks, the post-sync blocks, and the C2 parity sync blocks (as shown in FIGS. 9, 11, 13, and 15), an application ID comprising items AP 1 and AP 2 is stored in the three high order bits of ID 0. Thus, AP 1 is written eight times and AP 2 is written 14 times. Writing these IDs multiple times protects them from error and enhances their reliability.

Figures 20, 21A, 21B:
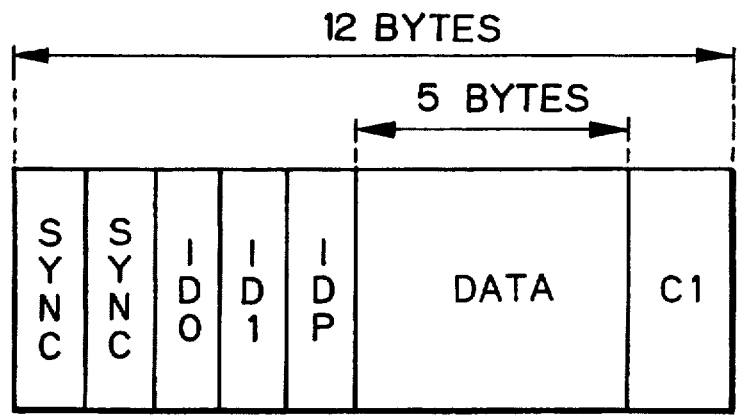
FIG. 20 shows the structure of a sub-code sync block.
FIGS. 21A and 21B are schematic diagrams showing the format of an ID portion.

FIG. 19 illustrates the structure of a sub-code sector, which is located at the end of each track and is used primarily for high-speed searching. Unlike the previously discussed audio and video sectors, the preamble and postamble of the sub-code sector do not include a pre-sync block or a post-sync block. In addition, the data length of the sub-code sector is made longer than that of the audio sector or video sectors in order to minimize errors that take place at the beginning of the track when writing an index. As shown in FIG. 20, the byte length of the sub-code sync block is 12 bytes. The first five bytes of the sub-code sync block is the same as the first five bytes of the audio-sync block or the video-sync block. The next five bytes of the sub-code sync block constitute a data portion that stores packs.

The horizontal parity C1 has only two bytes, and it protects the data portion. Unlike the previously described audio and video sectors, the sub-code sector does not include a C2 parity code because the sub-code sector is mainly used for high speed searching, during which the C2 parity cannot be easily detected. Each track has 12 sub-code sync blocks. Since the sub-code sync blocks are recorded in accordance with the 24-25 conversion modulating system, the total bit length is as follows:

12×12×8×25÷24=1200 bits.

FIGS. 21A and 21B show the ID portions of the sub-code sector. The contents of the first half portion (FIG. 21A) of the sub-code sector differs from the contents of the second half portion (FIG. 21B). An F/R flag is stored at the MSB of the ID 0, and it distinguishes the first half portion from the second half portion during variable speed reproduction and high speed searching. The next lower three bits represent AP 3 as an application ID for sync numbers 0 and 6. For sync numbers other than 0 and 6, an index ID, a skip ID, and a PP ID (Photo & Picture ID) are stored. The index ID is a conventional ID for searching an index. The skip ID identifies a portion of a program to be skipped. The PP ID searches for a still image. Absolute track numbers (ABSTR0-ABSTR7) are stored in both ID 0 and ID 1. The absolute track numbers are successively assigned to the tracks in ascending order, starting at the beginning of the tape and are used, for example, when searching the TOC (Table of Contents). The four low order bits of ID 1 represent a sync number of the track.

FIG. 22 shows the data portion of the sub-code sector. The horizontal direction of FIG. 22 corresponds to tracks 1 to 10, and the vertical direction of this Figure reveals that each of these tracks comprises 12 packs, which are labelled 0 to 11. In FIG. 22, upper case letters correspond to a main area of the data portion, and lower case letters correspond to an optional area of the data portion. The main area stores information that is necessary for high speed searching; such information may comprise time codes or record dates, for example. Since this information can be searched on a pack-by-pack basis, this operation is referred to as a pack searching operation. Unlike the pack arrangements of FIGS. 12 and 17, the packs of FIG. 22 cannot be connected for use. If two or more areas are labelled with the same letter, these areas include the same pack. The arrangements of letters in FIG. 22 reveals a repetitive pattern among tracks 1 to 10. For example, in tracks 1 to 5, main pack areas 1 to 3 and main pack areas 7 to 9 always include packs C, B, and A, in that order; optional pack areas 4 to 6 and optional pack areas 10 to 12 of tracks 1 to 5 alternate their contents between packs f, e, d, and c, b, a, respectively. Similarly, in tracks 6 to 10, main pack areas 1 to 3 and 7 to 9 always include packs E, D, and A, in that order; optional pack areas 4 to 6 and 10 to 12 alternate their contents between packs l, k, j, and i, h, g, respectively. The purpose of this repetitive pack arrangement is to guard against error by compensating for the reduced parity protection that is attributable to the absence of a C2 parity code in the sub-code sector. The pack arrangement of FIG. 22 can be used in the 525 lines/60 Hz system or the 625 lines/50 Hz system.

Figure 23:
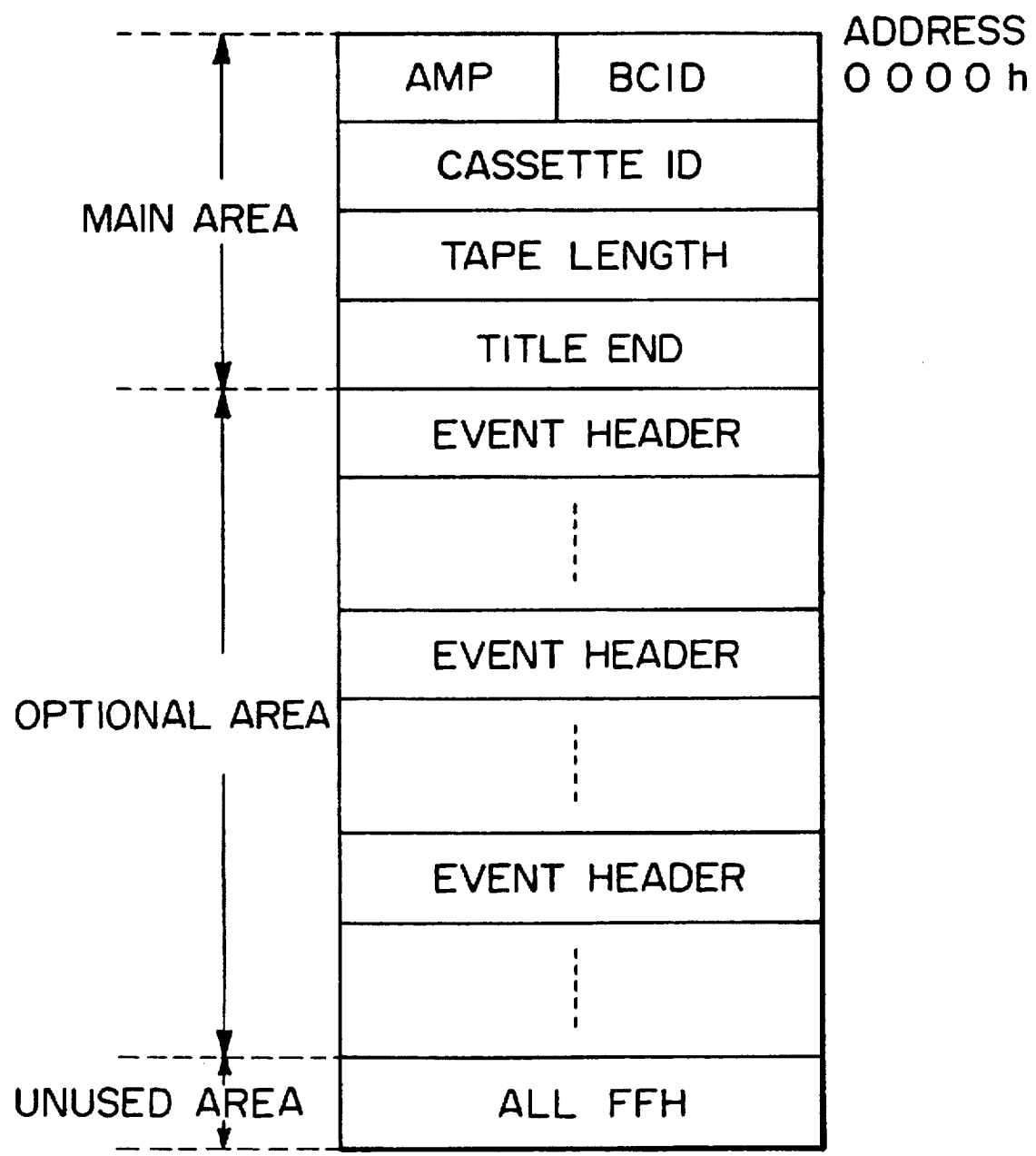
FIG. 23 is a schematic diagram showing a data structure of a memory integrated circuit (MIC)

FIG. 23 illustrates the data structure of the MIC. The MIC comprises a main area, an optional area, and an unused area (FFh). Except for the first byte and the unused area of the MIC, the data of the MIC is arranged in accordance with either a variable length pack structure or a fixed length pack structure, in which each pack comprises five bytes. The variable length pack structure stores character data, and the fixed length pack structure stores the remaining data, such as the video and audio auxiliary date (VAUX and AAUX) and sub-code data. Each pack, whether from the fixed length or variable length arrangement, begins with a pack header identifying the contents therein.

The application ID of the MIC is stored in address 0000h; this address comprises an APM of three bits and a BCID (Basic Cassette ID) of four bits. In conventional 8 mm VCR cassettes, recognition holes formed in the cassette housing identify the tape thickness, type, and grade. With respect to cassettes used in the present invention, the BCID eliminates the need for such recognition holes by storing such information in the application ID of the MIC. The next three addresses of the MIC data structure respectively store packs corresponding to the cassette ID, the tape length, and the title end. The cassette ID pack stores more data relating to the value of the tape thickness, and it also stores general information relating to the memory of the MIC.

The title end pack stores the number of tracks that have been written by the tape manufacturer, and the tape length pack stores the length of the tape. These two packs are useful in determining the amount of tape that was not used in recording the copyrighted material. The title end pack can also be effectively used when the recording operation of a camcorder is temporarily stopped and then returned to the last recorded position or when a timer record operation is used.

The optional areas comprise a plurality of event headers. While the main area in FIG. 23 is a fixed area of 16 bytes from address 0 to address 15, the optional area is a variable length area starting from address 16. Thus, the length of the optional area depends on the content recorded therein. When information is erased from any portion of the optional area, the size of the optional area is reduced by the data length of the erased information, and the size of the unused area increases by that same amount. The optional area stores, for example, the Table of Contents (TOC), tag information for marking a point on the tape, and character information, such as titles of programs. When the value of a pack header is FFh, the corresponding pack is deemed not to include any information.

The dubbing protecting method of the present invention will now be described. This dubbing protection is available for a digital VCR recording medium that stores compressed video data. The non-video signals, such as the vertical blanking interval, are used only in the analog output of the digital VCR and are not stored on the recording medium. In this method, a copyright protection signal (CP signal) is placed in the vertical blanking interval of the analog output. Thus, when an analog recording VCR attempts to illegally dub a tape through the analog output of the digital VCR, the CP signal disturbs the servo function of the recording analog VCR, thereby preventing the analog VCR from producing a faithful copy of the digitally recorded video. This is described in EP Application No. 94307003.7.

Figure 24:
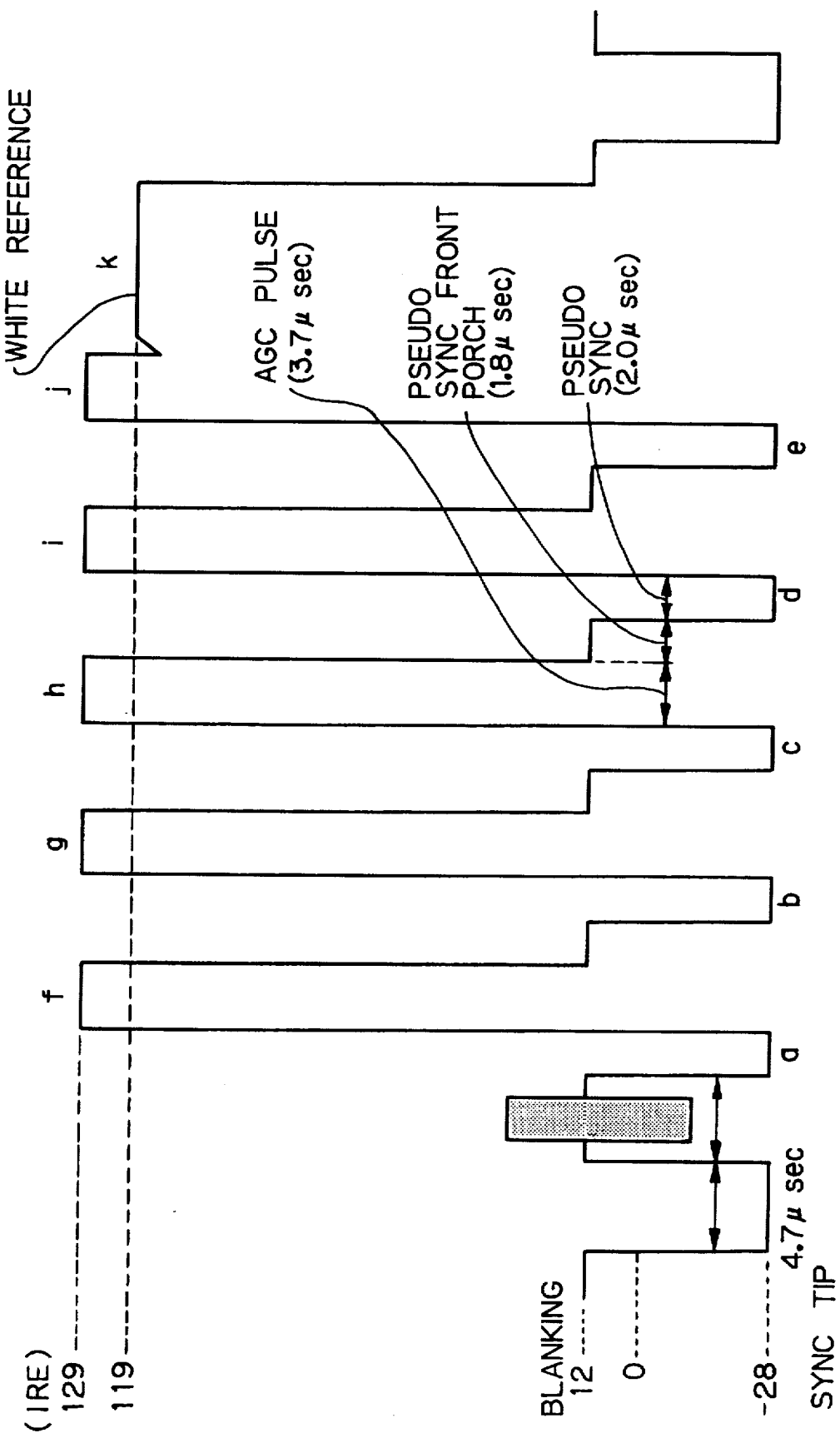
FIG. 24 is a schematic diagram showing a waveform of a copyright protection signal.

FIG. 24 illustrates the waveform of the CP signal. The CP signal comprises a plurality of pairs of pulses, each pair comprising a pseudo horizontal sync pulse and a positive pulse. A CP signal is placed in each of a plurality of lines in the vertical blanking interval. In particular, pseudo horizontal sync pulses a, b, c, d, and e are placed at positions where no actual horizontal sync pulses are present. The positioning of these pulses disturbs the servo circuit of the recording VCR. The CP signal also includes AGC pulse signals f, g, h, i, and j which, when detected by the usual AGC circuit of the VCR, vary the signal level of the recorded signal. The CP signal operates in two modes: in the pulsing mode, the AGC pulse signals vary between predetermined levels, and in the fixed mode, the maximum level of the AGC pulse signals is fixed at 129 IRE. In FIG. 24, k represents the white reference that is at a fixed level (119 IRE). However, from time to time, the level of the white reference may vary between 119 IRE and 129 IRE.

The SCMS signal, which comprises two bits, protects recorded data from being dubbed by a digital recording VCR. When the high order bit is "1", that bit indicates that the program material recorded on the tape has been copyrighted. When the low order bit is "0" that bit indicates that the program material recorded on the tape is an original. When viewed as a pair, these bits have the following definitions: When the bits are "00", the contents of the tape can be dubbed any number of times; when the bits are "10", the contents of the tape can be dubbed only once; when the bits are "11", the contents of the tape cannot be dubbed. The value of "01" has no significance and is not used in this system.

Figure 25:
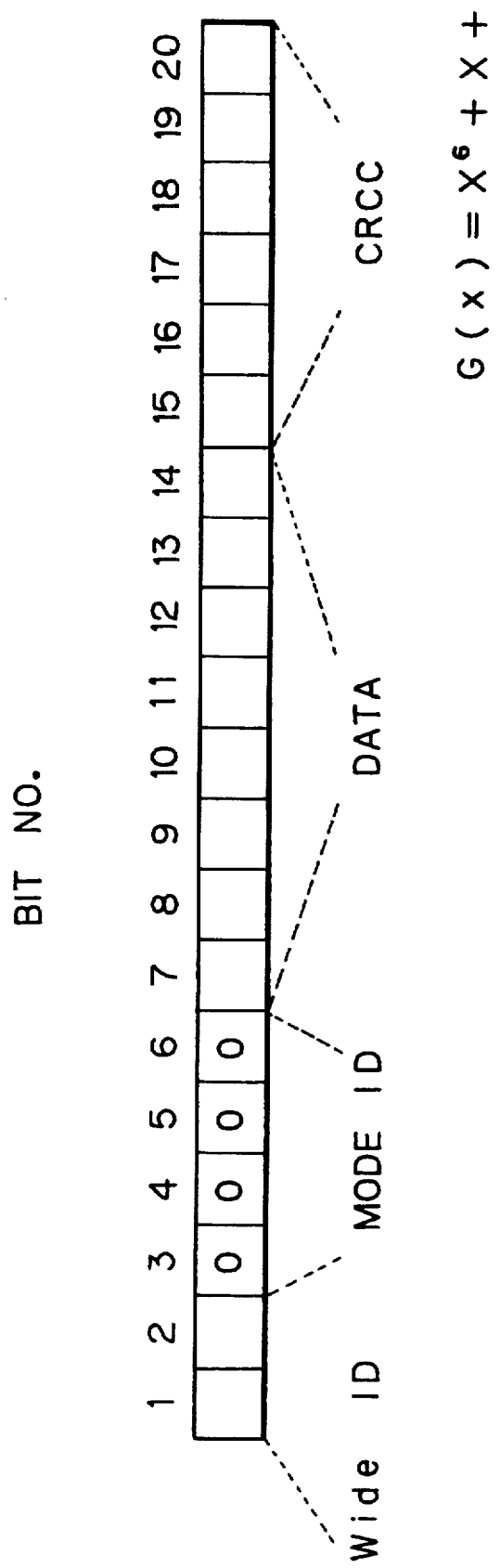
FIG. 25 is a schematic diagram of a vertical blanking interval identification (VBID) signal.

FIG. 25 illustrates VBID (Video Blanking ID) data that includes various identification codes transmitted in the lines of the vertical blanking interval of an analog video signal. The VBID data is used as an identification signal. The VBID signal comprises a reference signal of 70 IRE and a 20-bit digital data portion with an amplitude of 70 IRE ("1") or 0 IRE ("0"). The VBID is placed in one horizontal line and has a clock frequency fc of 447 kHz.

Bit 1 represents a transmission aspect ratio. A value of "1" for bit 1 signifies an aspect ratio of 16:9. A value of "0" for bit 1 signifies an aspect ratio of 4:3. Bit 2 represents a screen display format. When the value of bit 2 is "1", it represents a letter box display. When the value of the bit 2 is "0", it represents a normal display. Bits 3 to 6 represent a mode ID. When the mode ID="0000", following bits identify the copyright status of the recorded material. When the mode ID="0000" and bit 7 is "0", there is no copyright protection for the recorded material. When the mode ID="0000" and bit 7 is "1" the recorded material is subject to copyright protection. Bit 8 signifies whether the recorded material is an original or a dubbed copy. When the value of bit 8 is "0", the image data and sound data constitute an original. When the value of bit 8 is "1", the image data and sound data are dubbed copies. In other words, bits 7 and 8 are equivalent to the SCMS information discussed before. Bits 15 to 20 constitute a Cyclic Redundancy Check Character (CRCC).

FIGS. 26A, 26B, 27A, and 27B illustrate a VCR system that uses the just-described CP signal, SCMS signal, and VBID signal in order to prevent a digital VCR from dubbing data that is copyrighted. The circuit blocks shown in FIGS. 26A, 26B, 27A, and 27B comprise a reproducing digital VCR 1, a recording digital VCR 20, and a recording analog VCR 40, which may comprise, for example, a VHS type VCR.

Figure 26B:
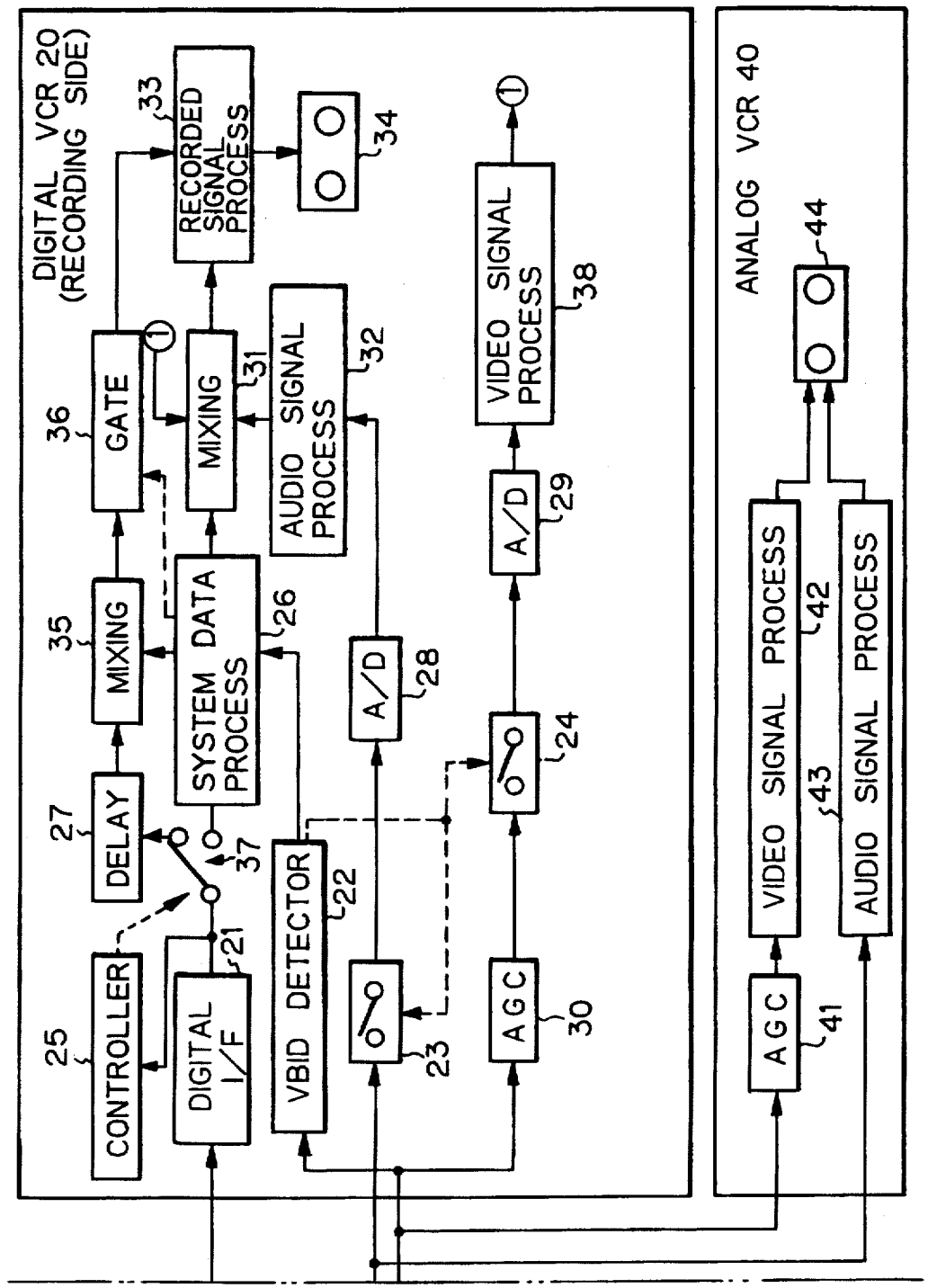

In FIGS. 26A and 26B, a cassette tape 2 is loaded in the reproducing VCR 1. The VAUX and AAUX areas of the tape store source control packs that include the SCMS signal. The data recorded on cassette tape 2 is channel decoded and error corrected by a reproduced signal process circuit 3. The processed data is supplied from the reproduced signal process circuit 3 to a digital interface circuit 13, an audio signal process circuit 4, a video signal process circuit 5, and a system data process circuit 6. The system data refers to data other than the actual video and audio data of cassette 2. The system data is stored in the TIA area, the VAUX area, the AAUX area, and the sub-code area of cassette tape 2.

The digital interface circuit 13 segments the reproduced video data, audio data, and system data into packets, adds a parity to each of the packets, and outputs them as digital data.

The audio signal process circuit 4 performs a deframing process and a deshuffling process, and supplies the output data to a D/A converting circuit 7. The converted signal is output as an analog audio signal.

The video signal process circuit 5 performs a deframing process, a decompressing process, a deshuffling process and a block desegmenting process, and supplies the output data to a D/A converting circuit 8.

The system data process circuit 6 controls the reproduction operation by supplying the system data recorded in the VAUX area and in the AAUX area to a signal process microprocessor, a mode process microprocessor, and a mechanical control microprocessor, all of which are not shown.

The system data process circuit 6 determines the state of the two-bit SCMS recorded in the source control packs of the AAUX area and the VAUX area. A CP signal generating circuit 10 generates a CP signal corresponding to the state determined by the system data process circuit 6. In other words, when the value of the SCMS recorded on the tape is "11", indicating that the dubbing operation is prohibited, the CP signal generator 10 generates a CP signal that prohibits the analog VCR from performing the dubbing operation.

The system data process circuit 6 supplies the SCMS recorded in the VAUX area on the tape to a VBID generator 11 which replaces the state of the SCMS supplied from the system data process circuit with the values of the bits 7 and 8 described above in conjunction with FIG. 25. Thus, the identification signal is superimposed on a predetermined vertical blanking line (for example, 21 H) in the above-described format.

D/A converter 8 generates an analog video signal from the video data supplied from video signal process circuit 5 and supplies this analog video signal to mixing circuit 12. Mixing circuit 12 also is supplied with a sync signal generated by a sync signal generator 9, a CP signal generated by the CP signal generator 10, and a VBID signal generated by the VBID generator 11. The mixing circuit 12 properly mixes these signals and outputs the mixed signal as a composite video signal.

The digital VCR 20 receives the digital data from the digital interface of digital VCR 1 and performs a digital dubbing operation. In addition, the digital VCR 20 can perform the dubbing operation for the analog audio data and analog video data received from the digital VCR 1.

Next, the method for preventing the digital dubbing operation will be described. The digital output of the digital VCR 1 is supplied to a digital interface circuit 21 of the digital VCR 20. The digital interface circuit 21 performs an error detecting process, and a packet desegmenting process.

The output data of the digital interface circuit 21 is supplied to a controller 25 and also to a system data process circuit 26 via a switch 37. The system data process circuit rewrites the state of the SCMS signal when necessary. The controller 25 determines whether or not the supplied data is system data. When the supplied data is system data, the position of the switch 37 controlled to couple the output of interface 21 to the system data process circuit 26. On the other hand, when the supplied data is not system data, the switch 37 is controlled to couple the output of the interface to a delay circuit 27. The output data of the delay circuit 27 and the output data of the system data process circuit 26 are supplied to a mixing circuit 35.

The output of the mixing circuit is supplied to a gate circuit 36 which is controlled by a control signal supplied from the system data process circuit 26. For example, when the value of the SCMS signal is "11", the gate circuit 36 is closed, thereby preventing the copyrighted data from being recorded by digital VCR 1. Since the value of the gate circuit control signal depends on the value of the SCMS signal, the video data and the audio data can be supplied from gate circuit 36 either individually or together.

When the value of the SCMS signal in both the AAUX area and the VAUX area is "00", the video and audio data can be dubbed any number of times. Therefore, when the value of the SCMS signal is "00", the gate circuit 36 is opened and the video data and audio data are recorded on the cassette tape 34, which has been previously loaded into digital VCR 20.

The SCMS signal supplied from the digital VCR 1 is present in both the VAUX area and the AAUX area. Therefore, the SCMS can suppress the dubbing of either the audio data or the video data or both.

FIG. 28 illustrates two tables showing the operation of the system data process circuit 26 (of FIG. 26B) as a function of the SCMS signal values in the VAUX area and the AAUX area. These tables show four methods. In METHOD 1, when the VAUX SCMS signal is "00", the system data process circuit 26 does not change the value of the VAUX SCMS signal and it permits unlimited copies of the video data to be made. Similarly, when the AAUX SCMS signal is "00", this value is not changed and unlimited copies of the audio data are permitted. When the value of either the VAUX or AAUX SCMS is "10", one copy of the corresponding video or audio data is permitted and the system data process circuit 26 changes the SCMS signal value from "10" to "11". When the value of either the VAUX SCMS or the AAUX SCMS signal is "11", the data represented by this particular SCMS signal value cannot be recorded. Thus, for example, if the AAUX SCMS signal is "11" and the VAUX SCMS is either "00" or "10", then only the audio data cannot be dubbed. METHOD 2 differs from METHOD 1 in that if either the VAUX or AAUX SCMS signal is "11", then both the video and audio data cannot be dubbed. Thus, for example, if the VAUX SCMS signal is "00" and the AAUX SCMS signal is "11", then both the audio and video data cannot be dubbed, even though the value of "11" in this case corresponds only to the AAUX SCMS signal. In METHOD 3, the dubbing of the audio data is always permitted, regardless of the value of the SCMS signal in the AAUX area, and the dubbing of video data is controlled by the value of the SCMS signal in the VAUX area, as in METHOD 1. In METHOD 4, the dubbing of video data is always permitted, regardless of the value of the SCMS signal in the VAUX area, and the dubbing of audio data is controlled by the SCMS signal in the AAUX area, as in METHOD 1.

In each method, when the audio data is to be prohibited from being dubbed to a recording cassette, the audio data that otherwise would be recorded is replaced on the recording cassette with data that generates either no sound or a predetermined noise during reproduction of the contents of the recording cassette. When the video data is to be prohibited from being dubbed to a recording cassette, the video data that otherwise would be recorded is replaced with data that blocks out the original image during reproduction of the recording cassette. Alternatively, the video data can be replaced with data that generates a message to be displayed on a particular screen. This message, for instance, may read "DUBBING PROHIBITED".

When the VBID is placed in the vertical blanking interval of the analog video signal that is output from the digital VCR 1, the VBID is detected by a VBID detector 22 into the recording digital VCR 20. In this example, the VBID includes only the VAUX SCMS signal. When the value of the VAUX SCMS signal in the VBID is "11", the dubbing of video data is prohibited. Therefore, the gate circuit 36 is closed by the system data process circuit 26 which responds to the detected VBID data.

When the value of the VAUX SCMS signal in the VBID data is "10", the video data may be dubbed once. After receiving the SCMS data, the system data process circuit 26 rewrites the value of the VAUX SCMS to "11" reproduced analog. The reproduced analog video data is supplied to a video signal process circuit 38 through an AGC circuit 30, a switch 24, and an A/D converting circuit 29. The video signal process circuit 38 processes the video data.

Assuming that the audio data can also be dubbed, the reproduced analog audio data is supplied to an audio signal process circuit 32 through a switch 23, an A/D converting circuit 28, and an audio signal process circuit 32. The audio signal process circuit 32 processes the audio data. The processed video data and audio data are supplied to a mixing circuit 31 which mixes this data and the VAUX SCMS signal supplied from system data process circuit 26 and supplies the mixed data to a recorded signal process circuit 33. Thus, the recorded signal process circuit 33 records the data on the cassette tape 34. Since the VAUX SCMS signal has been rewritten to "11", no further dubbing of the video data from cassette tape 34 is possible.

Either the CP signal or the VBID signal can be placed in the vertical blanking interval of the analog video signal received from the digital VCR 1. The CP signal causes the switch 23 to be opened so as to prevent the audio data from being dubbed.

In the above-description, although only the SCMS signal in the VAUX area is transmitted with the VBID in bits 9 and 10 (see FIG. 25), the SCMS in the AAUX area can also be transmitted in the VBID. By doing so, as represented by FIG. 28, either the audio data or the video data can be selectively prevented from being dubbed.

When an analog VCR uses the analog output of digital VCR 1 to dub the video and audio signals recorded on cassette 2, the CP signal prevents an AGC circuit 41 of the analog VCR 40 from functioning properly, thereby preventing the analog VCR from dubbing the recorded video and audio signals.

Figure 27A:
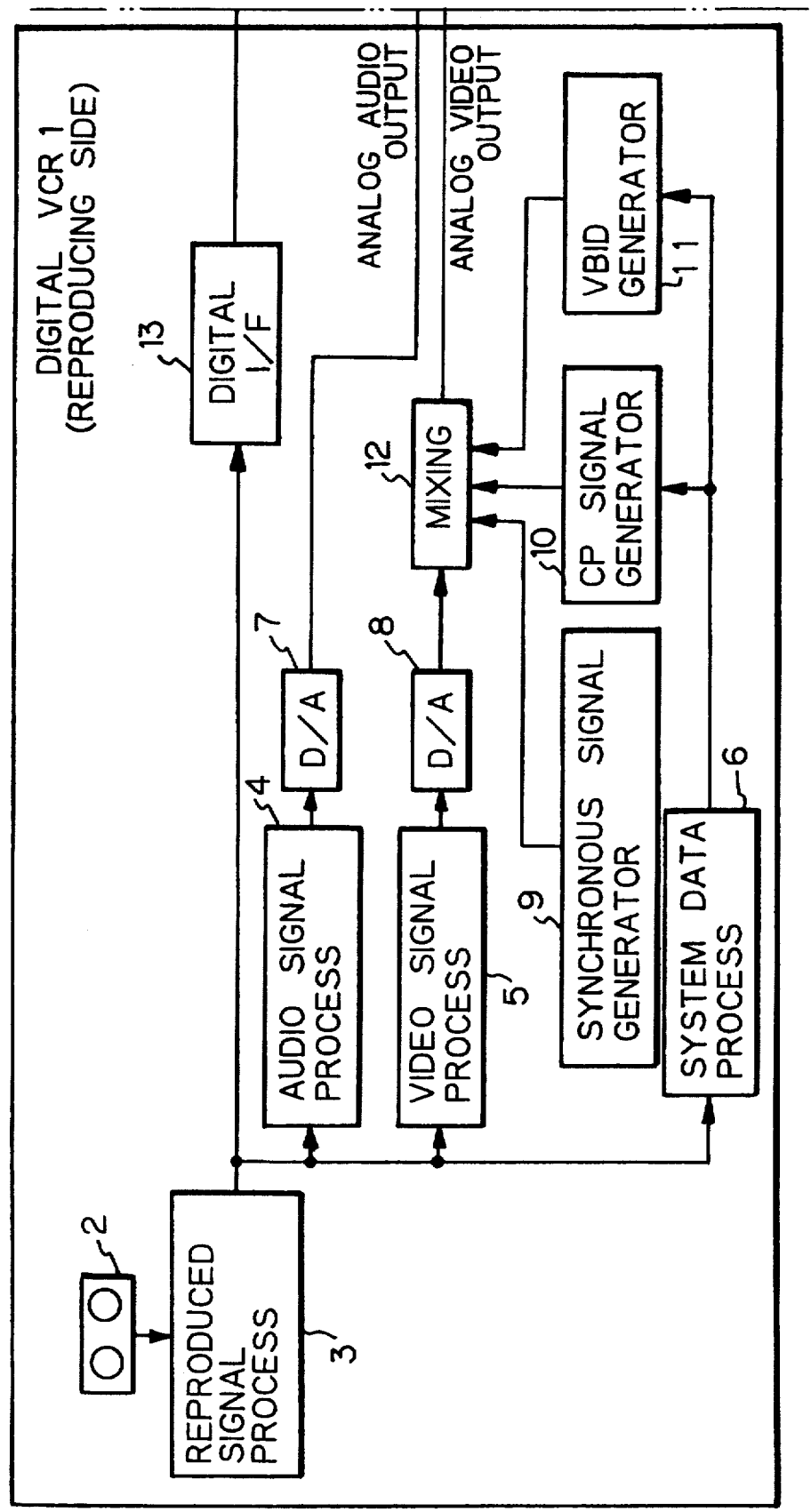

The digital VCR 1 and the analog VCR 40 shown in FIGS. 27A and 27B are the same as those shown in FIGS. 26A and 26B. The digital recording digital VCR 20 shown in FIG. 27B differs from the digital recording VCR 20 in FIG. 26B only in that the recording VCR 20 in FIG. 27B does not have the AGC circuit 30 shown in FIG. 26B. Thus, the digital VCR 20 of FIG. 26B and the digital VCR 20 of FIG. 27B are prevented from digitally dubbing data in the same manner as each other. With respect to analog dubbing, however, the recording digital VCR 20 of FIG. 26B prevents the dubbing of this signal by opening switch 23 (and switch 24) and by disrupting AGC 30, while the recording digital VCR 20 of FIG. 27B prevents the dubbing of this signal merely by opening switches 23 and 24.

The data structure of the aforementioned source control pack recorded in the VAUX area and the AAUX area now will be described. FIG. 29 shows a source control pack recorded in the VAUX area. The pack header of this pack has a value of "01100001" in binary notation and "61h" in hexadecimal notation. As explained with respect to FIG. 17, this pack is recorded at 10 positions in the main area of the VAUX, each of these areas being labelled as "61". In the pack shown in FIG. 29, the SCMS signal is recorded at the high order bits of byte PC 1.

The next data field in PC 1 after the SCMS signal is the copy source field. This field comprises two bits: when the value of the copy source field is "00", it signifies that dubbing of an analog signal is permitted; when the value is "01", it signifies that dubbing of a digital signal is permitted; when the value is "11", it signifies no information. The value of "10" is not used in the copy source field.

The next data field in PC 1 is the copy generation field: When the value of the copy generation field is "00", it signifies a first generation copy of the recorded program; when the value is "01", it signifies a second generation copy; when the value is "10", it signifies a third generation copy; and when the value is "11", it signifies a fourth generation copy. FIG. 29 illustrates other data fields, but they will not be described here because they do not relate to the present invention.

FIG. 30 shows a source control pack recorded in the AAUX area. The pack header of this pack has a value of "01010001" in binary notation, or "51h" in hexadecimal notation. As explained with respect to FIG. 12, this pack is recorded at 10 positions in the main area of the AAUX, each of these areas being labelled as "51". The SCMS signal is recorded in the two high order bits of byte PC 1 in this pack. The various modes defined by the SCMS signal and the PCi fields of this pack are the same as those of the source control pack of FIG. 29.

FIG. 31 illustrates that the source control pack recorded in the VAUX area may include an RI (Recording Inhibit) flag, which comprises one bit as the most significant bit in the byte PC4. The RI flag has the following definitions: a value of 0 indicates that the CP signal is to be generated; a value of 1 indicates that the CP signal is not to be generated.

When the system of either FIGS. 26A and 26B or FIGS. 27A and 27B uses the source control pack of FIG. 31, the system data process circuit 6 causes VBID generator 11 to generate VBID data that includes the SCMS signal of this source control pack. The system data process circuit 6 also uses the RI flag in deciding whether or not to cause CP signal generator 10 to generate a CP signal. The CP signal generated by the CP signal generator is normally inserted into the vertical blanking interval of the analog video signal. Alternatively, the CP signal can be recorded in one of the optional areas of the VAUX of the digital video signal, as illustrated in FIG. 17.

The manner in which a CP signal is recorded in the VAUX area will now be described. A line pack as shown in FIGS. 32A and 32B is used to record the CP signal. In particular, the line pack of FIG. 32A includes a line header pack with a PC 0 value of "10000000", and the line data pack of FIG. 32 includes a PC 0 value of "10000001". A line number representing the CP signal is recorded in binary notation in PC 1 of the line header pack. This line number can range from 1 to 1250. PC 2 includes B/W, EN, ELF, and CM. PC 3 records TDS, which includes the total number of samples in binary notation. PC 4 includes QU, which represents the number of quantizing bits, and SAMP, which represents the sampling frequency.

When the EN flag is "0", it signifies that the color frame is valid; when the EN flag is "1", it signifies that the color frame is invalid. CLF represents the color frame number. When the CM flag is "0", it signifies that the data in the first and second fields are common; when the CM flag is "1", it signifies that the data of the first and second fields are independent of one another. With respect to the TDS data field, a value of "00" signifies that the total number of samples comprises two bits; a value of "01" signifies that the total number of samples comprises four bits; and a value of "10" signifies that the total number of samples comprises eight bits. The value of "11" is not used in the TDS data field. With respect to the SAMP data field, a value of "000" signifies that the sampling frequency is 13.5 MHz; a value of "001" signifies that the sampling frequency is 27.0 MHz; a value of "010" signifies that the sampling frequency is 6.75 MHz; a value of "011" signifies that the sampling frequency is 1.35 MHz; a value of "100" signifies that the sampling frequency is 74.25 MHz; and a value of "101" signifies that the sampling frequency is 37.125 MHz. Values "110" and "111" are not used in the SAMP data field.

The B/W data field, the EN flag, and the CLF flag are employed primarily in commercial VCRs. For home use VCRs, the values of the B/W data field, the EN flag, and the CLF flag are fixed to "1111".

PC 1 to PC 4 of the line data pack, as shown in FIG. 32B store the sampled digital data of the CP signal in the form of four blocks of eight bits each. Thus, one line data pack records 32 bits of data.

Figure 33B:
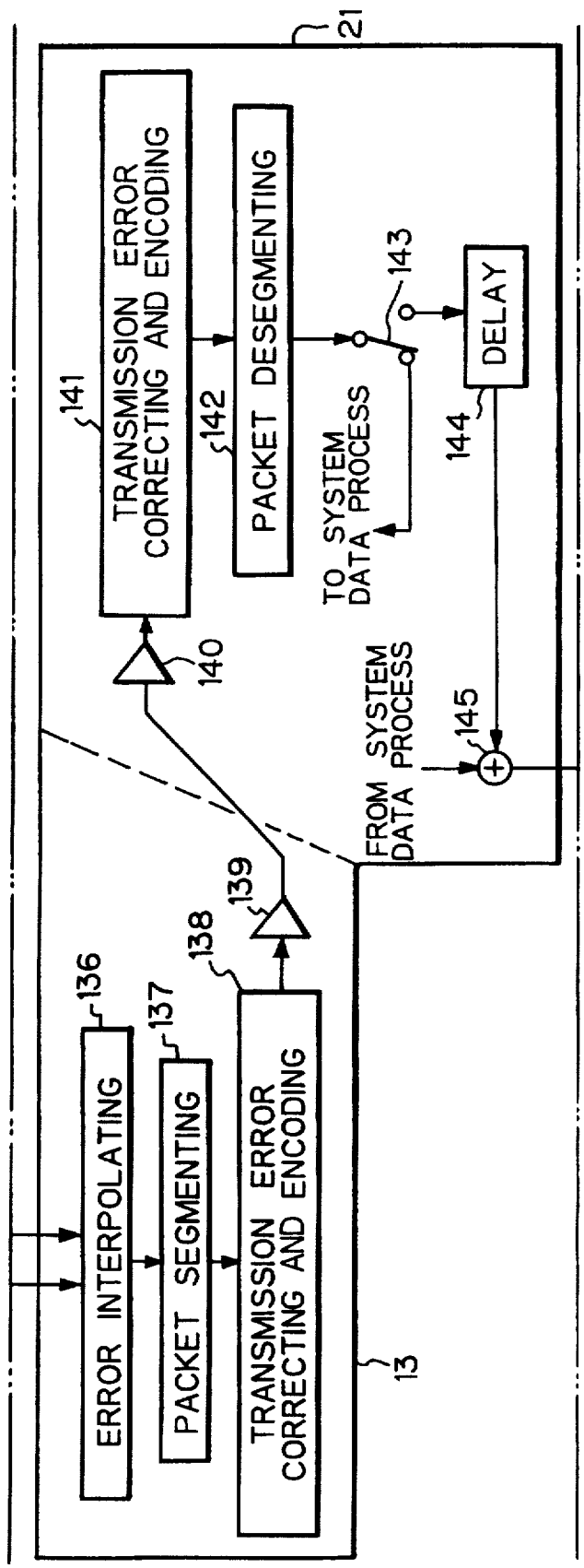
Figure 33C:
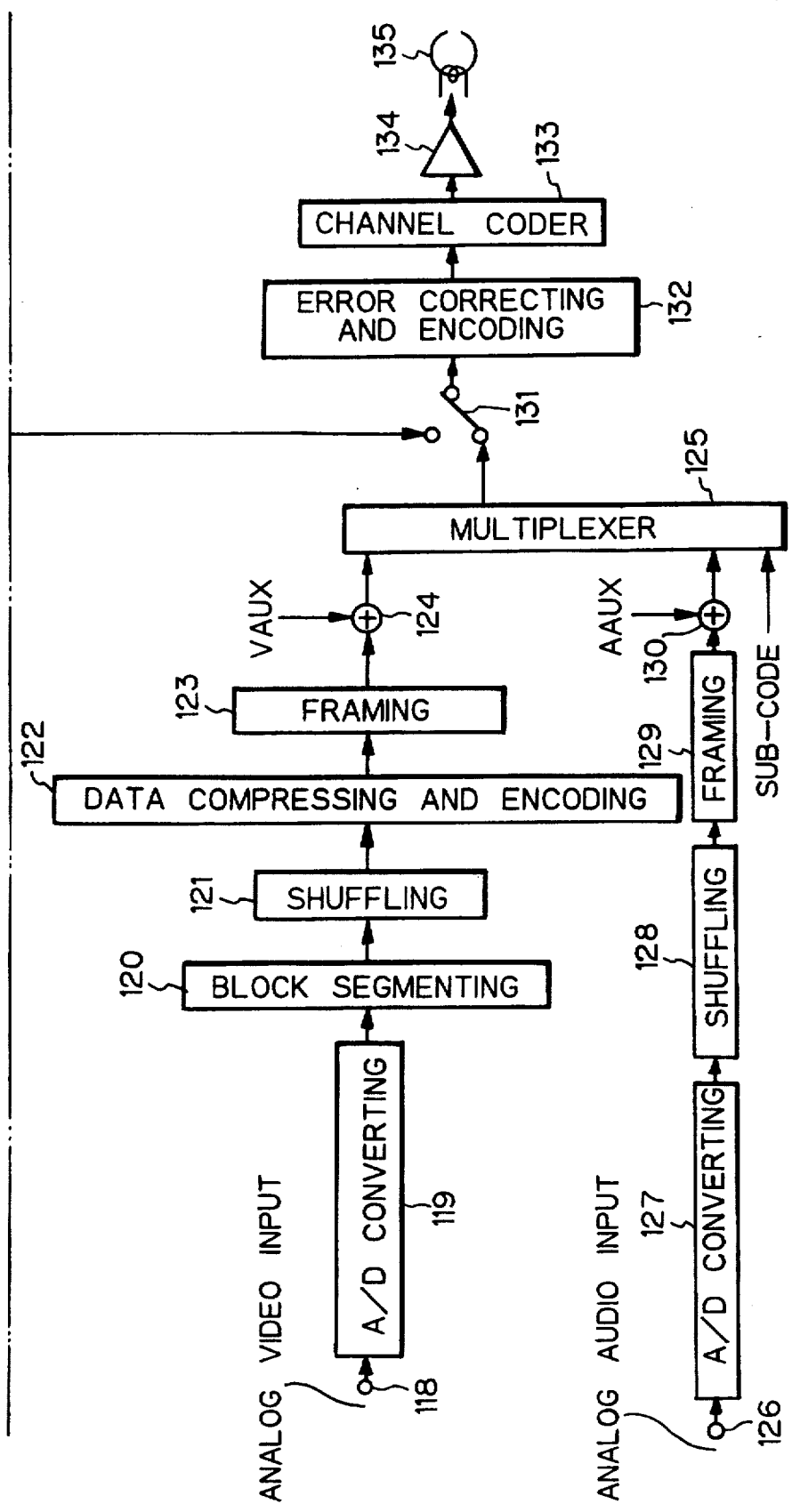

The line header pack and the line data pack are written to the optional area of the VAUX area. The reproducing VCR determines the state of the SCMS signal (or the RI flag) of the source control packs recorded in the main area of the VAUX area and the AAUX area, reproduces the CP signal recorded in accordance with the state of the SCMS signal (or RI flag), and places the CP signal in the vertical blanking interval FIGS. 33A, 33B, and 33C are block diagrams showing a digital VCR adapted to perform a dubbing operation. First, the operation of the reproducing section of the digital VCR will be described. In FIGS. 33A, 33B, and 33C, data obtained from playback head 101 is equalized in amplifier 102. The amplified data is then equalized in equalizer circuit 103 and supplied to time base corrector (TBC) 104, which corrects the time base of the input signal. The output of the time base corrector is supplied to channel decoder 105 whose output is supplied to error correcting circuit 106, which corrects any errors in the supplied data. If the error correcting circuit cannot correct a particular error, it appends an error flag to the data. The output of error correcting circuit 106 is supplied to demultiplexer 107, which demultiplexes the supplied data into video data, audio data, sub-code data, VAUX area data, and AAUX area data. Deframing circuit 108 is supplied with the video data, and deframing circuit 114 is supplied with the audio data. The sub-code data, VAUX data, and AAUX data are supplied to other processing circuits, which are not illustrated in FIG. 33A.

The video data output of deframing circuit 108 is supplied to data decompressing and encoding circuit 109 from which the decompressed video data is supplied to deshuffling circuit 110 and block desegmenting circuit 111, which restore the video data positions to the original image space positions. The resultant video data is supplied to D/A converting circuit 112 that converts the digital signal into an analog signal. The analog signal is obtained from an analog video output terminal 113.

The audio data supplied to deframing circuit 114 is deframed and then supplied to a deshuffling circuit 115 that restores the original time base of the audio data. At this point, when necessary, the audio data is interpolated if an error flag indicates an uncorrectable error. The resultant data is supplied to D/A converter 116 that converts the digital audio signal into an analog audio signal. The analog signal is obtained from analog audio output terminal 117.

Next, the operation of the recording section of the digital VCR is described with respect to FIG. 33C. An analog video signal is input through analog video input terminal 118 and supplied to A/D converting circuit 119, which converts the analog video signal into digital data. The digital data is supplied to block segmenting circuit 120, which segments the digital signal into blocks comprising eight samples by eight lines, and the output of the block segmenting circuit is supplied to shuffling circuit 121, which shuffles the blocks so as to prevent data recorded on the tape from being lost due to head clogging or horizontal scratches on the tape. Shuffling circuit 121 changes the order of the blocks so that the luminance signal and the color difference signal can be easily processed in subsequent circuits.

The output of shuffling circuit 121 is supplied to data compressing and encoding circuit 122 which includes a compressing circuit that uses either a DCT technique or a variable length encoding technique, an estimator that determines whether or not the data has been compressed at a predetermined level, and a quantizing device that quantizes the compressed data in accordance with that determination. Framing circuit 123 packs the compressed video data into a predetermined sync block and supplies its output to composing circuit 124, which is also supplied with VAUX area data. After composing the digital video data and the VAUX area data, composing circuit 124 supplies the composed signals to a multiplexer 125.

The analog audio signal supplied from analog audio input terminal 126 to A/D converting circuit 127 is digitized and coupled to shuffling circuit 128, which shuffles the digital audio data. The output of shuffling circuit 128 is supplied to framing circuit 129 that packs the audio data into an audio sync block. The output of framing circuit 129 is supplied to composing circuit 130, which also is supplied with AAUX area data. Composing circuit 130 supplies the composed audio signals to multiplexer 125.

After multiplexing the composed video and audio signals, multiplexer 125 supplies its output through switch 131 to error correction code generating circuit 132 which adds predetermined parity signals to the data. The output of the error correction code generating circuit is supplied to channel encoder 133 for encoding the data to be recorded. Thereafter, the encoded data is amplified by amplifier 134 and supplied to recording head 135.

Next, the dubbing of data from a digital reproducing VCR to a digital recording VCR is described. In FIG. 33B the solid, L-shaped block is divided by a broken line into digital interface circuits 13 and 21. The output of error correcting circuit 106 (FIG. 33A) is supplied to error interpolating circuit 136, the purpose of which is to respond to data errors that error correcting circuit 106 could not correct. As explained before, error correcting circuit appends an error flag to data that it cannot correct and the response of error interpolating circuit 136 to such an error flag depends on the type of data in which the error occurred. If an uncorrected error occurs in data that has been written many times, as in the main data areas of FIGS. 12 and 17, error interpolating circuit 136 waits to receive an error-free version of the originally received data. That is, error interpolating circuit 136 waits until it receives a version of the originally received data to which an error flag has not been appended. This error-free data is then supplied as the output of error interpolating circuit 136. If an uncorrected error occurs in data that is not repeatedly written, as in video or audio data, or when a correct version of repeatedly written data is not received within a predetermined period of time, error interpolating circuit 136 rewrites the data in the following manner: In the case of audio data of 16 bits, the data is written as "1000 0000 0000 0000"; in the case of audio data of 12 bits, the data is written as "1000 0000 0000"; in the case of the DC component of video data that has undergone a DCT, the data is written in a pack structure, including a NO INFO pack.

The output of error interpolating circuit 136 is supplied to packet segmenting circuit 137 which segments the data into packets. The packets are supplied to a transmission error correction code generating circuit 138 that adds a parity signal to the data so as to protect the data from errors on the transmission line. The resultant data is supplied to receiver 140 of the recording digital VCR through driver 139. Receiver 140 converts the data to a predetermined voltage level or, alternatively, to a predetermined current level which then is supplied to transmission error correcting circuit 141, which removes any error that may be introduced by the transmission line. The resultant data is supplied to packet desegmenting circuit 142 which performs the reverse process of the packet segmenting circuit 137. When transmission error correcting circuit 141 cannot correct a particular error, the packet that includes the uncorrected error is sent to switch 143.

Switch 143 selects the video/audio data or the system data. If the system data is selected, such system data is output by switch 143 to a system data process circuit. The system data process circuit processes data that should be rewritten, such as the SCMS signal. The processed system data, for example, the rewritten SCMS signal, is supplied to a composing circuit 145. Composing circuit 145 also receives video or audio data that has been delayed by delay circuit 144, which may comprise a FIFO. The delay circuit delays the video or audio data for a time period necessary for rewriting the system data. Composing circuit 145 composes the data received from the system data process circuit (not shown) and the delayed video or audio data which is then supplied to switch 131 (FIG. 33C) for processing by error correction circuit 132 and channel encoder 133 and recording the recording digital VCR. In this manner, the copyright to the recorded data is protected.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A reproducing apparatus having a copy protection system for copy protecting a digitally reproduced digital signal from unauthorized copying by both a digital VCR and an analog VCR, said apparatus comprising:

reproducing means for digitally reproducing said digital signal recorded digitally on a recording medium, said digital signal comprising a video signal, an audio signal, and a digital copy protection signal for flagging whether the reproduced digital signal is re-recordable;

means for generating a serial copy management system (SCMS) signal in response to reproducing said digital copy protection signal;

means for generating an analog signal representing said digital signal in analog form;

means for generating automatic gain control pulses as an analog copyright protection signal in response to reproducing said digital copy protection signal;

means for generating another analog copyright protection signal for interrupting a servo function in response to reproducing said digital copy protection signal;

means for inserting said automatic gain control pulses and said another copyright protection signal in a vertical blanking interval of said analog signal; and output means including a digital output for outputting said digital signal reproduced by said reproducing means with said SCMS signal and an analog output for outputting said analog signal with said analog copy protection signal and said another analog copy protection signal such that said digital signal reproduced by said reproducing means is copy protected from unauthorized copying by both said analog VCR and said digital VCR.

2. A reproducing apparatus according to claim 1, further comprising vertical blanking interval generating means for generating said vertical blanking interval of said video signal.

3. A reproducing apparatus according to claim 2, wherein said digital copy protection signal represents whether said digital signal recorded on said recording medium is copyrighted and whether said digital signal recorded on said recording medium is an original version.

4. A reproducing apparatus according to claim 2, wherein said means for generating the analog signal further comprises digital-to-analog converting means for converting said digital signal to said analog signal.

5. A reproducing apparatus according to claim 4, wherein said another analog copyright protection signal further comprises a plurality of pairs of pulses, each of said pairs of pulses comprising a pseudo sync pulse and a positive pulse, said another analog copyright protection signal being placed into a plurality of lines in said vertical blanking interval of said analog signal.

6. A reproducing apparatus according to claim 4, wherein said digital copy protection signal represents whether said digital signal recorded on said recording medium is copyrighted and whether said digital signal recorded on said recording medium is an original version.

7. A reproducing apparatus according to claim 1, wherein said recording medium comprises a first area for recording said video signal, a second area for recording said audio signal, a third area for recording information relating to said video signal, and a fourth area for recording information relating to said audio signal, said third area including said digital copy protection signal relating to said video signal, and said fourth area including said digital copy protection signal relating to said audio signal.

8. The reproducing apparatus of claim 1, further comprising means for generating a video blanking ID signal representing in digital form information in said vertical blanking interval including display information for displaying a video picture from said video signal.

9. The reproducing apparatus of claim 8, wherein said means for generating said video blanking ID signal generates aspect ratio information as said display information for displaying said video picture from said video signal with a respective aspect ratio.

10. The reproducing apparatus of claim 8, wherein-said means for generating said video blanking ID signal generates a mode ID signal as said display information for indicating a copyright format of said digital copy protection signal.

11. The apparatus according to claim 1, wherein said SCMS signal indicates whether the recorded digital signal is copy protected and number of copies, if any, which are authorized.

12. The apparatus according to claim 11 further comprising means for inserting said SCMS signal into both a video auxiliary (VAUX) area and an audio auxiliary (AAUX) area of the reproduced digital signal.

13. The apparatus according to claim 12, further comprising means for generating vertical blanking information data (VBID) representing said vertical blanking interval in digital form, wherein said VAUX and AAUX areas are inserted into said vertical blanking information data.

14. The apparatus according to claim 13, wherein said SCMS signal inserted into said VAUX area indicates copy protection for said video signal and said SCMS signal inserted into said AAUX area indicates copy protection for said audio signal.

15. The apparatus according to claim 14, further comprising means for selecting between a first mode of operation wherein said automatic gain control pulses vary in magnitude and a second mode of operation wherein said automatic gain control pulses exhibit the same predetermined magnitude.

16. A method of copy protecting, from unauthorized copying by both a digital VCR and an analog VCR, a digital signal digitally recorded on a recording medium which comprises the steps of:

digitally reproducing said digital signal from said recording medium comprising a video signal, an audio signal, and a digital copy protection signal for flagging whether the reproduced digital signal is re-recordable;

generating an analog signal representing said digital signal in analog form;

generating a serial copy management system (SCMS) signal in response to reproducing said digital copy protection signal;

generating automatic gain control pulses as an analog copyright protection signal in response to reproducing said digital copy protection signal;

generating another analog copyright protection signal for interrupting a servo function in response to reproducing said digital copy protection signal;

inserting said automatic gain control pulses and said another copyright protection signal in a vertical blanking interval of said analog signal; and outputting to a digital output said digital signal reproduced with said SCMS signal and outputting to an analog output said analog signal with said analog copy protection signal and said another analog copy protection signal such that said digital signal reproduced in said step of digitally reproducing is copy protected from unauthorized copying by both said analog VCR and said digital VCR.

17. (Amended) A method according to claim 16, further comprising the step of generating said vertical blanking interval of said video signal.

18. A method according to claim 17, wherein said digital copy protection signal represents whether said digital signal recorded on said recording medium is copyrighted and whether said digital signal recorded on said recording medium is an original version.

19. A method according to claim 17, wherein the step of generating said analog signal includes digital-to-analog converting said video and audio signals.

20. A method according to claim 19, wherein said another analog copyright protection signal further comprises a plurality of pairs of pulses, each of said pairs of pulses comprising a pseudo sync pulse and a positive pulse, said another analog copyright protection signal being placed into a plurality of lines in said vertical blanking interval of said analog signal.

21. A method according to claim 19, wherein said digital copy protection signal represents whether said digital signal recorded on said recording medium is copyrighted and whether said digital signal recorded on said recording medium is an original version.

22. A method according to claim 16, wherein said recording medium comprises a first area for recording said video signal, a second area for recording said audio signal, a third area for recording information relating to said video signal, and a fourth area for recording information relating to said audio signal, said third area including said digital copy protection signal relating to said video signal, and said fourth area including said digital copy protection signal relating to said audio signal.

23. The method of claim 16, further comprising the step of generating a video blanking ID signal representing in digital form information in said vertical blanking interval including display information for displaying a video picture from said video signal.

24. The method of claim 23, wherein said step of generating said video blanking ID signal generates aspect ratio information as said display information for displaying said video picture from said video signal with a respective aspect ratio.

25. The method of claim 23, further comprising the step of generating a mode ID signal for indicating a copyright format of said digital copy protection signal.

26. The method according to claim 16, wherein said SCMS signal indicates whether the recorded digital signal is copy protected and number of copies, if any, which are authorized.

27. The method according to claim 26, further comprising the step of inserting said SCMS signal into both a video auxiliary (VAUX) area and an audio auxiliary (AAUX) area of the reproduced digital signal.

28. The method according to claim 27, further comprising the steps of: generating vertical blanking information data (VBID) representing said vertical blanking interval in digital form; and inserting said VAUX and AAUX areas into said vertical blanking information data.

29. The method according to claim 28, wherein said step of inserting said SCMS signal into said VAUX area indicates copy protection for said video signal and said SCMS signal and inserting said SCMS signal into said AAUX area indicates copy protection for said audio signal.

30. The method according to claim 29, further comprising the step of selecting between a first mode of operation wherein said automatic gain control pulses vary in magnitude and a second mode of operation wherein said automatic gain control pulses exhibit the same predetermined magnitude.

* * * * *